(12) United States Patent
Yamazaki et al.

(10) Patent No.: US 6,487,686 B1
(45) Date of Patent: Nov. 26, 2002

(54) ERROR CORRECTION METHOD AND TRANSMISSION APPARATUS

(75) Inventors: Yukio Yamazaki, Yokohama (JP); Takatoshi Nakamura, Sapporo (JP); Tsuyoshi Morishita, Sapporo (JP); Junichi Ishiwatari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/473,228

(22) Filed: Dec. 27, 1999

(30) Foreign Application Priority Data

Dec. 28, 1998 (JP) ............................................. 10-374805

(51) Int. Cl.$^7$ .................................................. H04J 3/14
(52) U.S. Cl. ........................................ 714/703; 370/241
(58) Field of Search ............................... 714/703, 705, 714/713; 370/241

(56) References Cited

U.S. PATENT DOCUMENTS

| | | | | |
|---|---|---|---|---|
| 5,095,482 A | * | 3/1992 | Grallert | 375/213 |
| 5,455,832 A | * | 10/1995 | Bowmaster | 370/228 |
| 5,574,717 A | * | 11/1996 | Tomizawa et al. | 341/94 |
| 5,764,651 A | * | 6/1998 | Bullock et al. | 714/704 |
| 5,805,571 A | * | 9/1998 | Zwan et al. | 370/249 |
| 5,930,273 A | * | 7/1999 | Mukojima | 714/776 |
| 6,061,329 A | * | 5/2000 | Abe | 340/825.01 |
| 6,222,877 B1 | * | 4/2001 | Govindarajan | 375/224 |
| 6,233,073 B1 | * | 5/2001 | Bowers et al. | 359/110 |
| 6,259,291 B1 | * | 7/2001 | Araki | 340/825.01 |

FOREIGN PATENT DOCUMENTS

JP  3-198546  8/1991

* cited by examiner

*Primary Examiner*—Stephen M. Baker
(74) *Attorney, Agent, or Firm*—Katten Muchin Zavis Rosenman

(57) ABSTRACT

An error correction method and a transmission apparatus used in a transmission using a frame including a header and a payload are provided. In the error correction method and the transmission apparatus, a pseudo error is inserted in check bits of the frame to be transmitted. Thus, an error-correcting function of a transmitter and a receiver can be easily tested. A mismatch of a state of validation or invalidation of the error-correcting function between the transmitter and the receiver can be avoided without affecting a main signal by inserting information on whether or not an error correction is performed in an unused area of the header in the transmitter.

15 Claims, 25 Drawing Sheets

FIG. 1 PRIOR ART

| | | | 9 BYTES | | | | | |
|---|---|---|---|---|---|---|---|---|
| A1 | A1 | A1 | A2 | A2 | A2 | J0 | ✕ | ✕ |
| B1 | △ | △ | E1 | △ | | F1 | ✕ | ✕ |
| D1 | △ | △ | D2 | △ | | D3 | | |
| | | | | | | | | |
| B2 | B2 | B2 | K1 | | | K2 | | |
| D4 | | | D5 | | | D6 | | |
| D7 | | | D8 | | | D9 | | |
| D10 | | | D11 | | | D12 | | |
| S1 | | | | | M1 | E2 | ✕ | ✕ |

9 ROWS

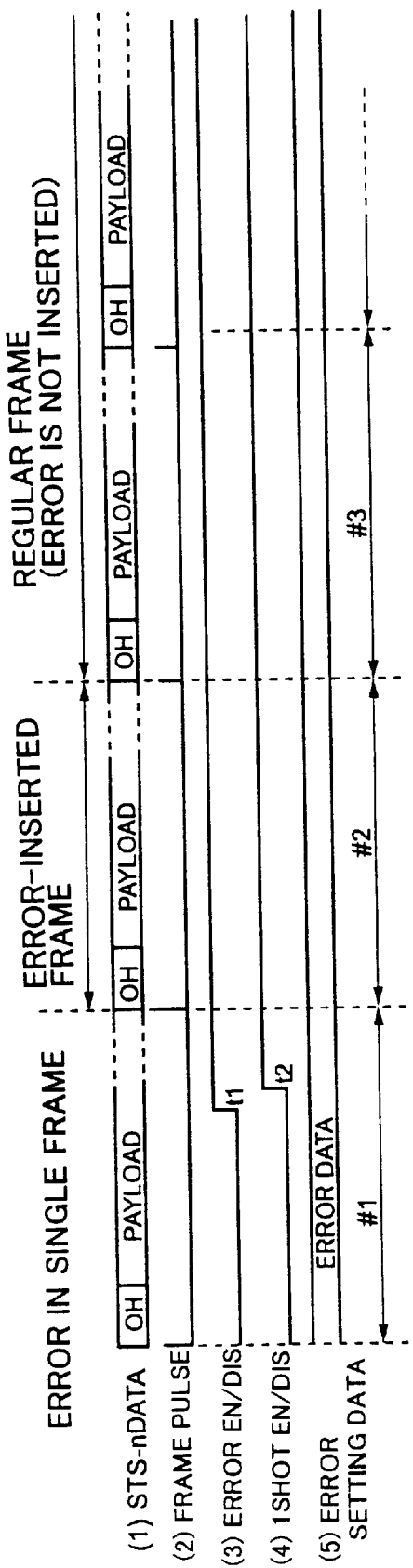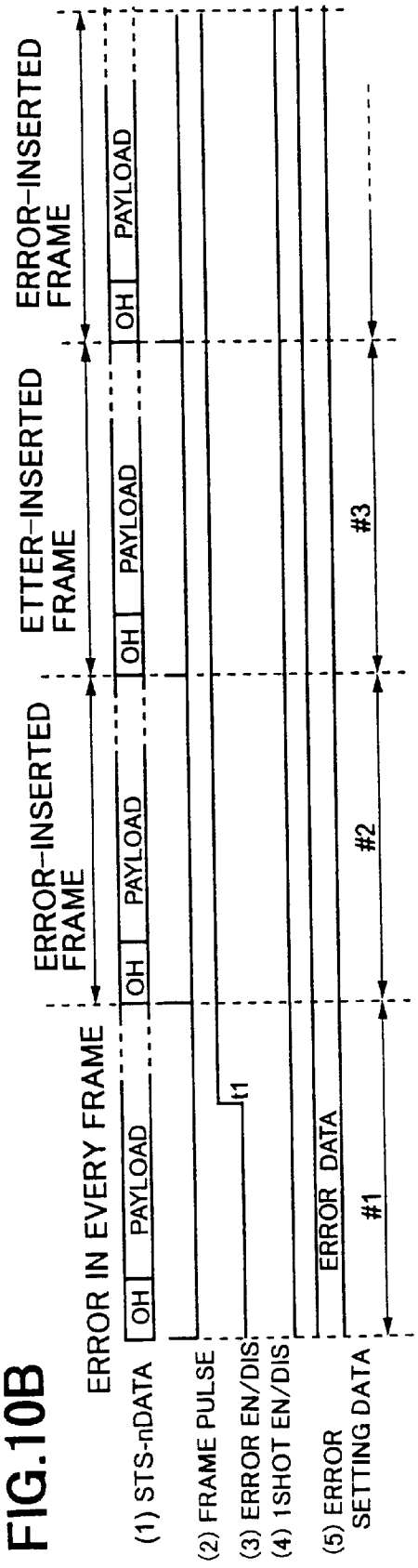

FIG. 13

| FEC STATE OF TRANSMITTER (RECEIVED VALUE) | CURRENT FEC STATE OF RECEIVER | FEC STATE OF RECEIVER AFTER SWITCHING | ALARM OF MISMATCH |
|---|---|---|---|
| FEC INVALIDATED | FEC INVALIDATED | FEC INVALIDATED | — |
| FEC INVALIDATED | FEC VALIDATED | FEC INVALIDATED | ALARM |
| FEC VALIDATED | FEC INVALIDATED | FEC INVALIDATED | ALARM |
| FEC VALIDATED | FEC VALIDATED | FEC VALIDATED | — |

FIG.16
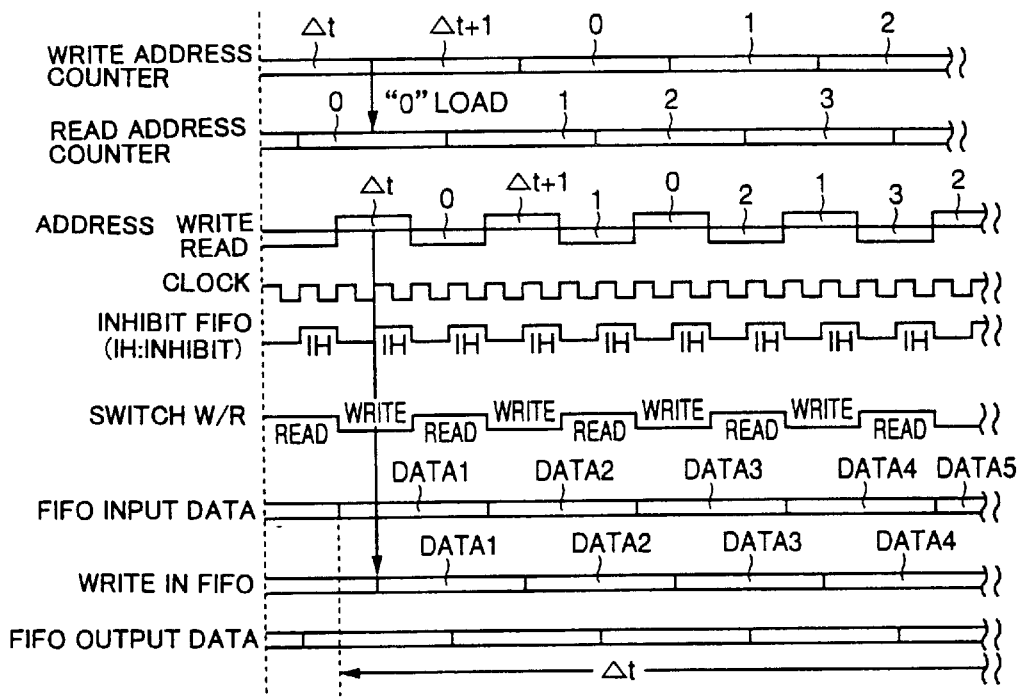
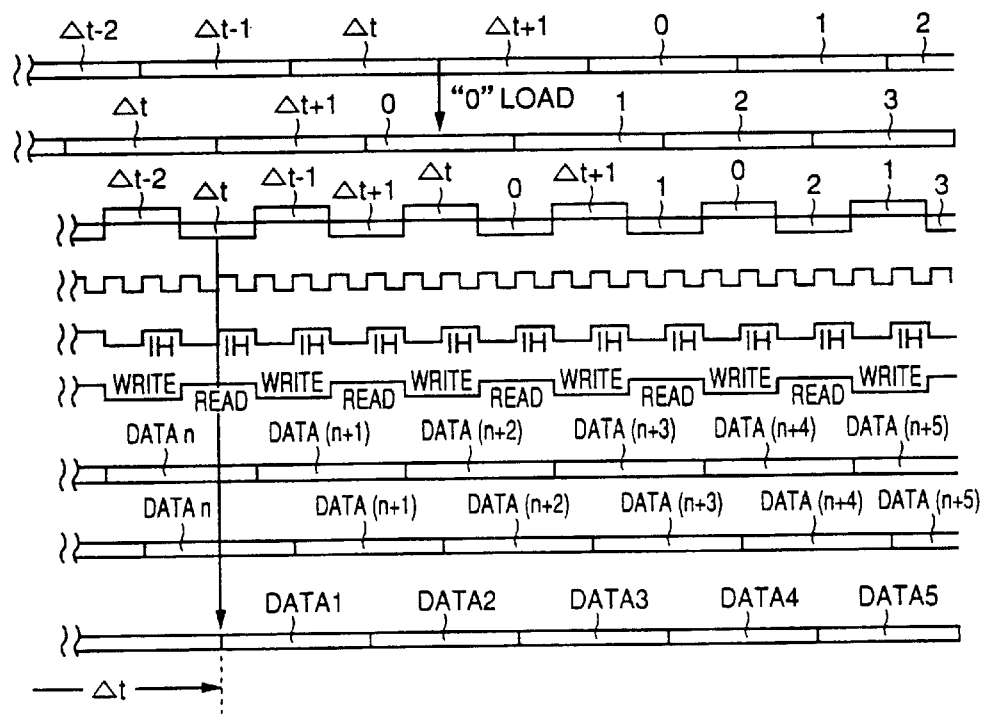

F I G. 20

| TRANSMITTER | | RECEIVER | | | |
|---|---|---|---|---|---|
| FEC STATE | Z2#6 | FEC STATE | RECEIVED Z2#6 | FEC OPERATION | PROBABILITY OF INVERSION OF FEC OPERATION BY 3-CONSECUTIVE-VALUE PROTECTION (ERROR RATE : $1 \times 10^{-4}$) |
| DIS | ALL 0 OR ALL 1 | DIS | ALL 1 OR 0 | × (NORMAL) | 0 SINCE FEC OF RECV. IS DIS |
| | | | OTHER THAN 1 OR 0 | × (NORMAL) | 0 SINCE FEC OF RECV. IS DIS |
| | | EN | ALL 1 OR 0 | × (NORMAL) | ABOUT $5 \times 10^{-10}$ CHANGE TO OTHER THAN ALL 1 OR 0 |
| | | | OTHER THAN 1 OR 0 | ○ (ABNORMAL) | ABOUT 1.0 TO CHANGE TO ALL 1 OR 0 (RETURN TO NORMAL) |
| EN | AAh | DIS | ALL 1 OR 0 | × (ABNORMAL) | 0 SINCE FEC OF RECV. IS DIS |
| | | | OTHER THAN 1 OR 0 | × (NORMAL) | 0 SINCE FEC OF RECV. IS DIS |
| | | EN | ALL 1 OR 0 | × (ABNORMAL) | ABOUT 1.0 TO CHANGE TO OTHER THAN ALL 1 OR 0 (RETURN TO NORMAL) |
| | | | OTHER THAN 1 OR 0 | ○ (NORMAL) | ABOUT $1 \times 10^{-48}$ TO CHANGE TO ALL 1 OR 0 |

FIG.22
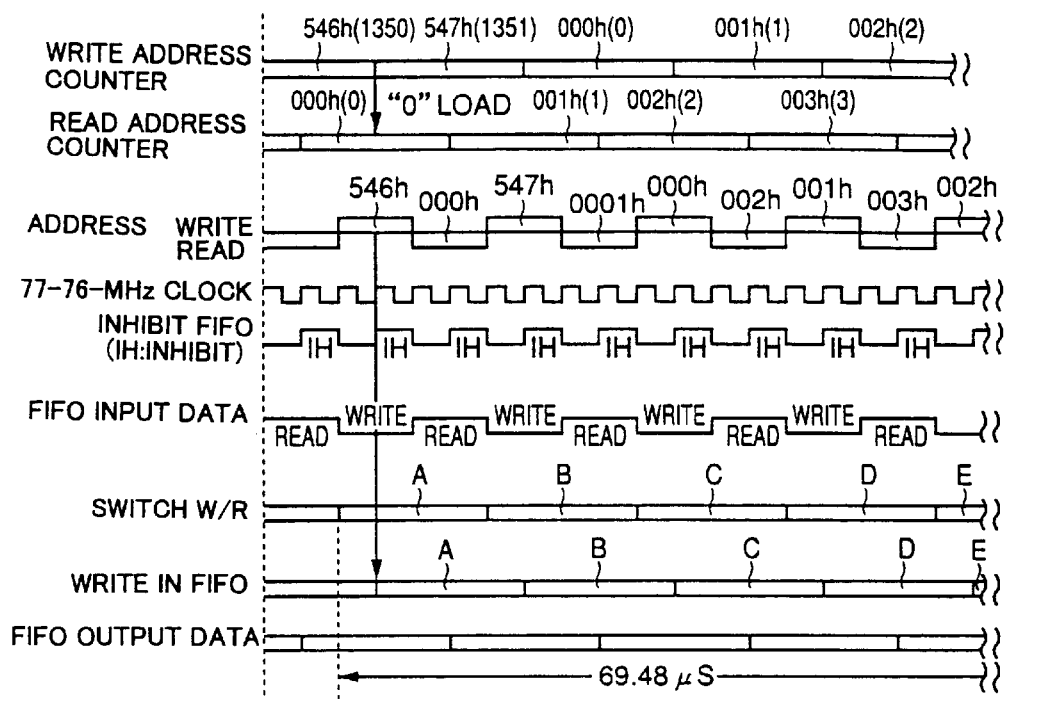
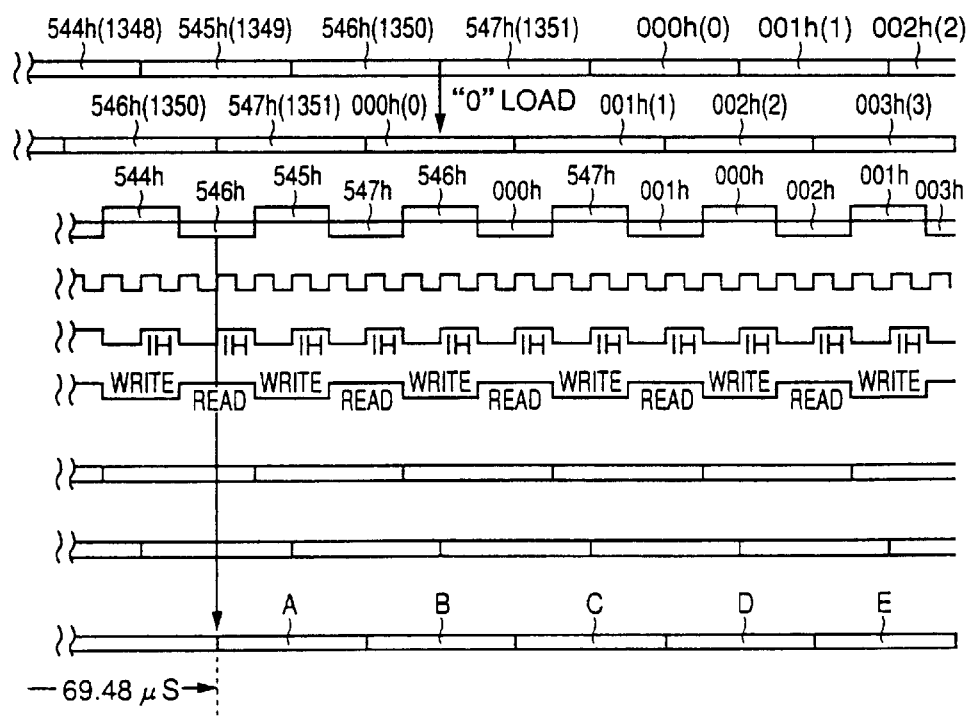

ERROR CORRECTION METHOD AND TRANSMISSION APPARATUS

BACKGROUND OF THE INVENTION

1. Field of the Invention

The present invention relates to an error correction method and a transmission apparatus, and in particular to an error correction method and a transmission apparatus applied to a transmission using a frame which comprises a header including control data and a payload including actual data.

2. Description of the Related Art

In North America, SONET (Synchronous Optical Network), which is standardized by ANSI (American National Standards Institute), is used as an optical synchronous transmission network. SONET uses OC-1 (Optical Carrier level 1) having a bit rate of 51.48 bits/second as a basic communication module. A transmission rate which is equal to 51.48 bits/second multiplied by n is represented by OC-n. At present, transmission rates up to OC-12 are standardized. A frame of OC-3 has the same structure as STM-1 (Synchronous Transport Module-1) of SDH (Synchronous Digital Hierarchy).

Generally, an error occurs in a transmission. In STM-1, for example, an occurrence of an error is monitored based on B1 and B2 bytes contained in a section overhead (SOH) having a size of nine bytes by nine rows, as shown in FIG. 1.

The B1 byte, for example, indicates BIP (Bit Interleave Parity)-8 and is used for detecting a transmission error. A value of the B1 byte is calculated as follows. That is, data to be transmitted is divided into groups, each of which consists of eight bits. A parity of the first bits of the respective groups is inserted in the first bit of the B1 byte, a parity of the second bits of the respective groups is inserted in the second bit of the B1 byte, and a parity of the third bits of the respective groups is inserted in the third bit of the B1 byte. The same process is performed for all eight bits of the groups. The B2 bytes indicate BIP-N×24 and are calculated in a similar manner for N×24 groups. It should be noted that values of the B1 and B2 bytes of a frame are obtained based on the data of an immediately succeeding frame. Additionally, the parity of the BIP-8 and BIP-N×24 is an even parity.

According to the conventional function of detecting an error in SONET or SDH, since only an occurrence of an error can be detected, the error cannot be corrected when a transmission quality is degraded. For this reason, conventionally, when a transmission quality is degraded, a transmission channel is switched to another one.

In a market of optical transmission systems in North America, IXC (Inter Exchange Carrier: a generic name of long-distance telephone companies such as AT&T and MCI) has become widespread overtaking the conventional BOC (Bell Operating Company). Thus, the IXC market of a long-distance transmission has become more important. However, the conventional function of detecting a transmission error in SONET or SDH has a problem that the transmission line is frequently switched due to a degraded quality of transmission since degradation of amplifiers provided in the transmission line cannot be ignored in a long-distance transmission.

In order for a receiver to test an error-correcting function, it is necessary to generate an error during a transmission. FIG. 2 is a diagram showing an example of a system which can test an FEC (forward error correction) function by using an attenuator. A transmitter FEC 2 is supplied with a signal from a pulse generator PPG (pulse pattern generator) 1 which comprises a PN (pseudonoise) generator circuit. Then, the transmitter FEC 2 generates and transmits a signal which includes an FEC error-correcting code using the signal supplied from the pulse generator PPG 1 as a main signal. An attenuator 3 provided in a transmission line attenuates the transmitted signal. A receiver FEC 4 receives the attenuated signal and corrects errors generated in the signal. According to this system, it is possible to check an improvement of an error rate achieved by using the FEC error-correcting code.

FIG. 3 is a diagram more specifically showing the system shown in FIG. 2. A transmitter 58 adds FEC check bits (51) to the signal from the pulse generator PPG 1 and performs a B2 calculation (53). The calculated values are written in the B2 bytes of an overhead of the signal to be transmitted. The attenuator 3 attenuates the signal, and a receiver 59 receives the attenuated signal. An FEC 54 corrects errors of the received signal, and an error counter 56 counts a number of the corrected errors. Additionally, the receiver 59 checks the B2 bytes (55) and determines an error rate of the channel (57), and thus confirms an improvement of the error rate of the transmission.

As mentioned above, the receiver 59 evaluates an improvement of the error rate achieved by the FEC by checking B2 parity. However, generation of an error can only be controlled on a basis of an average rate in the transmission test using the attenuator 3. Thus, when an error of an odd number of (three or more) bits is generated, the FEC using an even parity may erroneously correct the error. In this case, an error detector 5 detects a main signal error.

In other words, according to the system shown in FIG. 3, since the performance of the FEC is tested based on an improvement of the average error rate by the receiver 59 when the FEC is performed, it is difficult to test whether the error correction is properly performed as designed.

SUMMARY OF THE INVENTION

Accordingly, it is a first object of the present invention to provide an error correction method which can easily test an error-correcting function of a transmitter and a receiver in a transmission which uses a frame including a header and a payload.

It is a second object of the present invention to provide a transmission apparatus which can easily test an error-correcting function of the transmission apparatus in a transmission which uses a frame including a header and a payload.

It is a third object of the present invention to provide an error correction method which can easily avoid a mismatch of a state of validation or invalidation of an error-correcting function between a transmitter and a receiver.

It is a fourth object of the present invention to provide a transmission apparatus which can easily avoid a mismatch of a state of validation or invalidation of the error-correcting function between a transmitter and a receiver.

The first of object of the present invention can be achieved by an error correction method in a communication using a frame which comprises a header including control data and a payload including actual data, the method comprising:

a pseudo error inserting step of inserting a pseudo error in a check bit of the frame in a transmitter.

The second object of the present invention can be achieved by a transmission apparatus which performs a communication using a frame which comprises a header including control data and a payload including actual data, the apparatus comprising:

a pseudo error inserting part which inserts a pseudo error in check bits of the frame to be transmitted.

In these inventions, since the pseudo error is inserted in the check bits of the frame to be transmitted, the error-correcting function can be easily tested.

The third object of the present invention can be achieved by an error correction method in a communication using a frame which comprises a header including control data and a payload including actual data, the method comprising:

a step of inserting information on a state of validation or invalidation of an error-correcting function of a transmitter in an unused area of the header, which information indicating whether or not an error correction is performed in the transmitter.

The fourth object of the present invention can be achieved by a transmission apparatus which performs a communication using a frame which comprises a header including control data and a payload including actual data, the apparatus comprising:

an information inserting part which inserts information on a state of validation or invalidation of an error correcting function in an unused area of the header of the frame to be transmitted, the information indicating whether or not an error correction is performed.

In these inventions, since the information on whether or not an error correction is performed is inserted in an unused area of the header of the frame to be transmitted, a receiver can detect a state of validation or invalidation of the error-correcting function of the transmitter. Thus, it is possible to easily avoid a mismatch of the state of validation or invalidation of the error-correcting function between the transmitter and the receiver.

Other objects and further features of the present invention will be apparent from the following detailed description when read in conjunction with the accompanying drawings.

BRIEF DESCRIPTION OF THE DRAWINGS

FIG. 1 is a diagram showing an STM-1 section overhead;

FIG. 10A is a time chart showing an operation of the function of inserting a pseudo error when the pseudo error is inserted in a single frame;

FIG. 10B is a time chart showing an operation of the function of inserting a pseudo error when the pseudo error is inserted in every frame;

FIG. 13 is a diagram showing correspondences between the mismatch of the FEC state and the switching of the FEC state;

FIG. 16 is a time chart showing timings of the read/write operation of the FIFO when an FEC function is validated;

FIG. 20 is a diagram for illustrating the comparison of the FEC state performed in the receiver;

FIG. 22 is a time chart showing an operation of the FIFO read/write control when the FEC function is validated;

DESCRIPTION OF THE PREFERRED EMBODIMENTS

A detailed description of the present invention will be given with reference to STS-192 (Synchronous Transport Signal level 192) defined by SONET.

Figure 4:
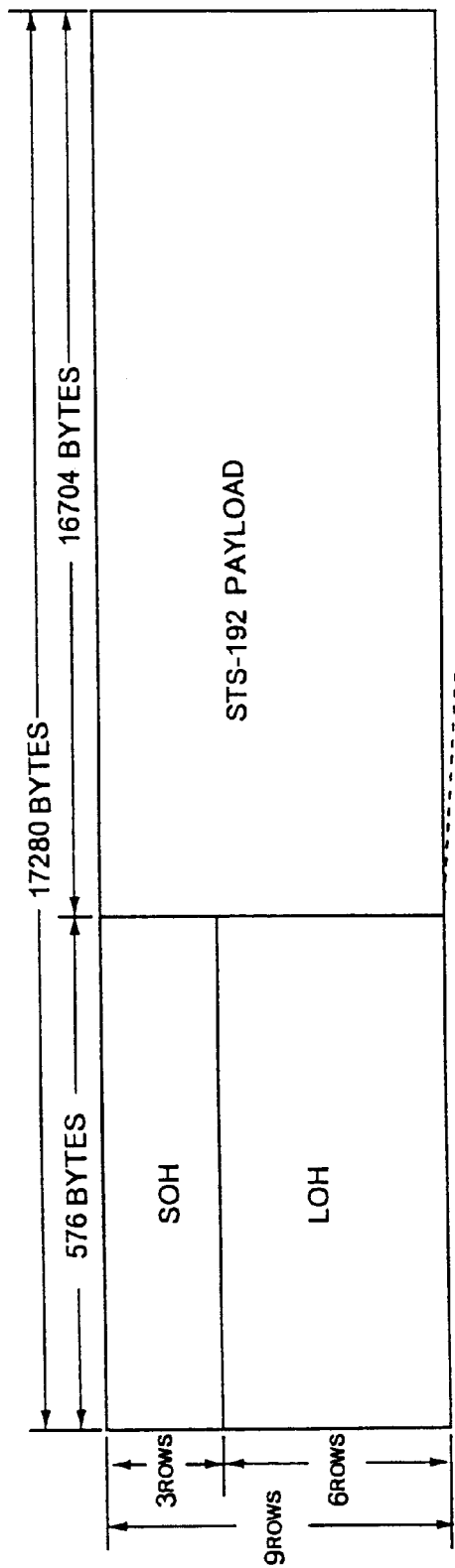
FIG. 4 is a diagram showing a format of a frame of STS-192.

FIG. 4 is a diagram showing a format of a frame of STS-192. As shown in FIG. 4, the frame of STS-192 consists of an SOH (section overhead) having a size of 576 bytes by three rows, an LOH (line overhead) having a size of 576 bytes by six rows, and a payload having a size of 16,704 bytes by nine rows. The STS-192 payload includes a POH (path overhead). The SOH and the LOH consist of various kinds of control bytes. The SOH is rewritten at each relay point between sections, and the LOH is terminated at terminal transmission apparatuses.

First, a brief description will be given of bytes which relate to the present invention among the above-mentioned control bytes. The B1 and B2 bytes are used for monitoring occurrence of errors, as mentioned above. K1 bytes are used for switching transmission lines between terminal stations. D1 to D3 bytes are data transmission channels between the relay points. D4 to D12 bytes are data transmission channels between terminal stations. Z2 bytes are reserved. In the present invention, check bits are inserted in some of unused bytes of the LOH.

Figure 5:
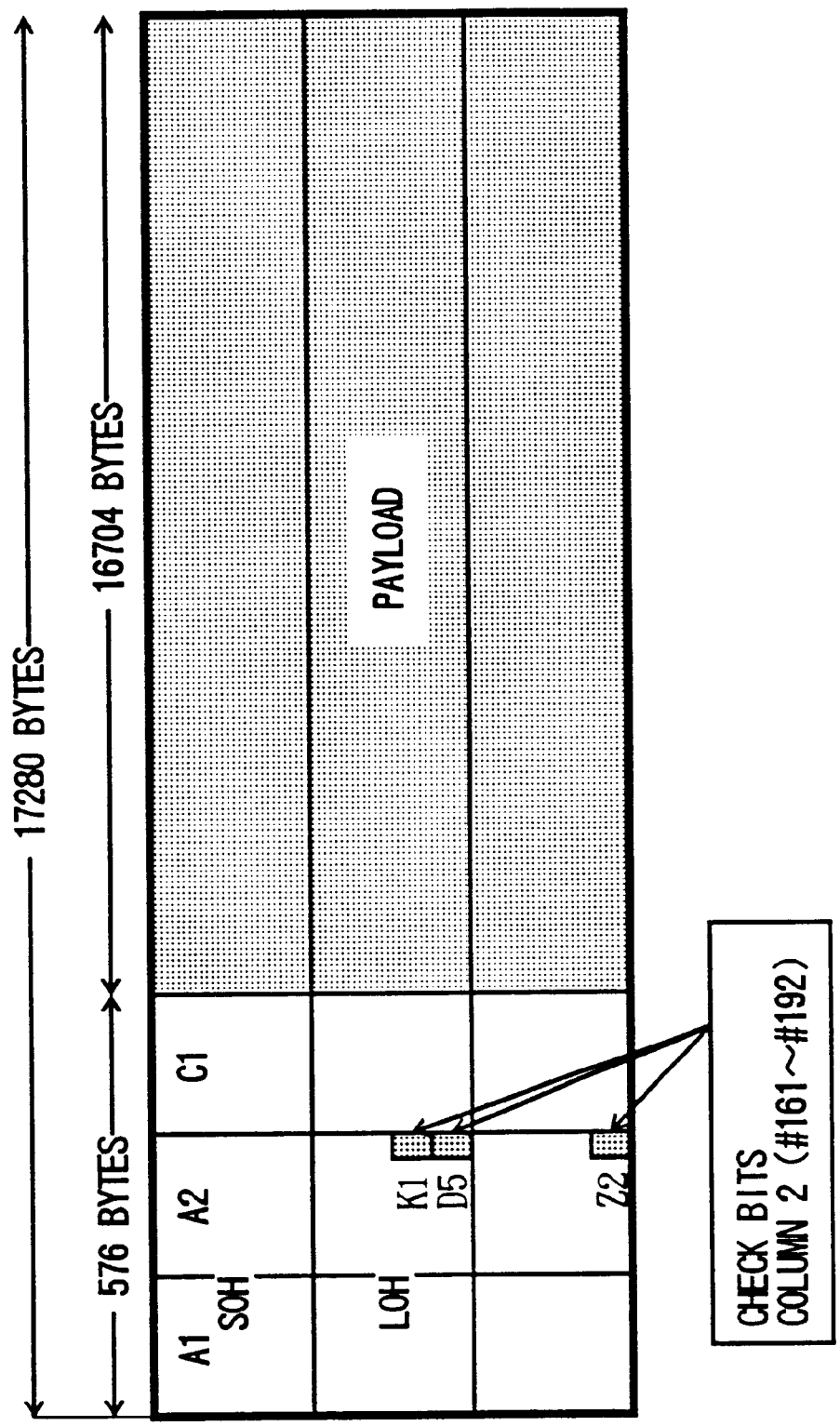
FIG. 5 is a diagram for illustrating a division of the frame and positions of check bits.

Next, a description will be given of a general error correction method prior to a description of the present invention. In the description of the present invention, an FEC is used as an error correction method. The FEC is performed by inserting check bits which are calculated based on the payload of STS-192 in unused K1, D5 and Z2 bytes of the LOH, as shown in FIG. 5.

Figure 6:
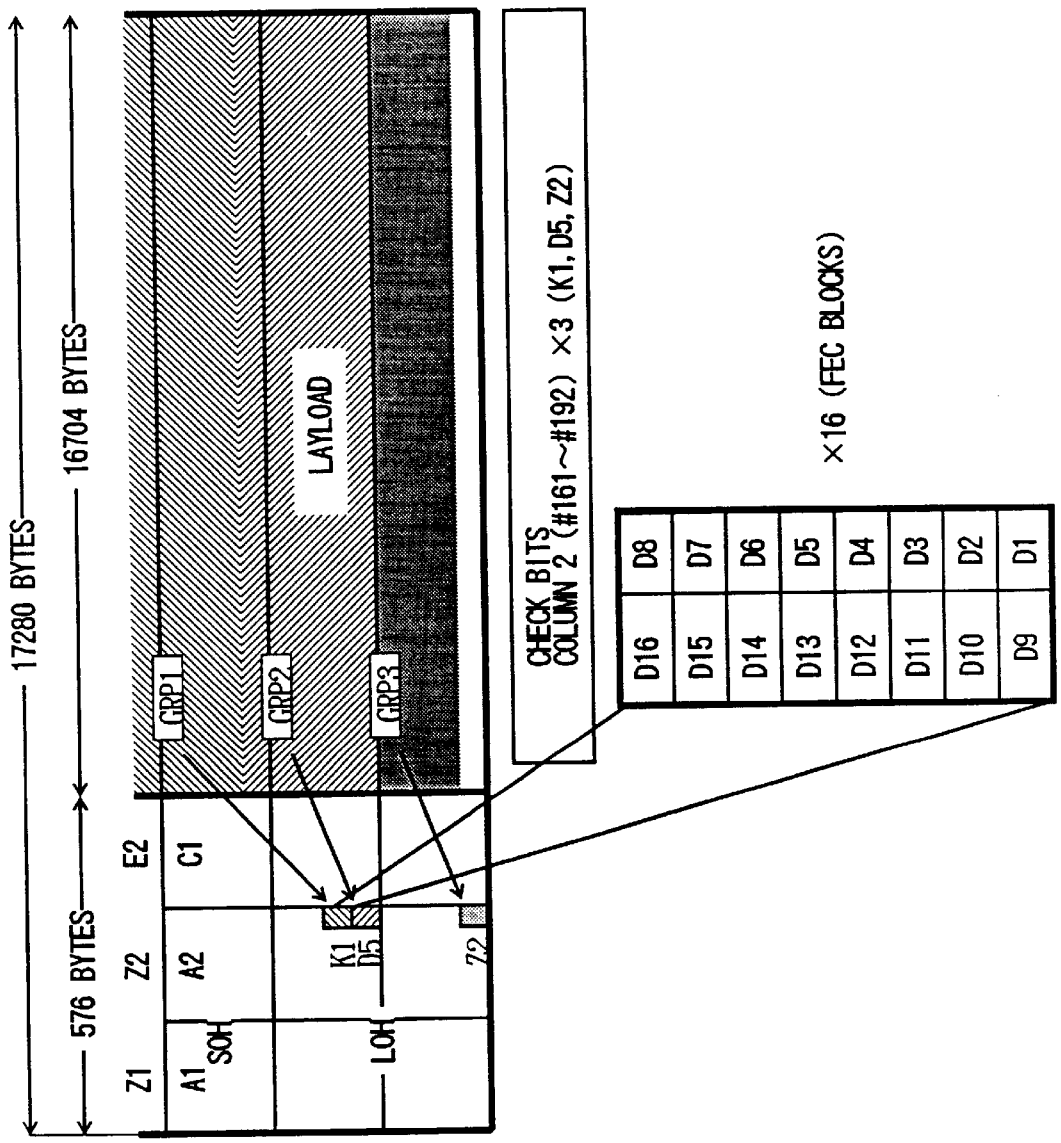
FIG. 6 is a diagram more specifically showing the frame shown in FIG. 5.

More specifically, as shown in FIG. 6, the FEC is performed with one frame being divided into three groups (GRP1 to GRP3), each of which includes three rows. The GRP1 consists of ninth, first and second rows of the frame, and check bits of the GRP1 are inserted in the unused K1 bytes. The GRP2 consists of third to fifth rows of the frame, and check bits of the GRP2 are inserted in the unused D5 bytes. The GRP3 consists of sixth to eighth rows of the frame, and check bits of the GRP3 are inserted in the Z2 bytes which are reserved.

Additionally, each of the GRPs is divided into sixteen blocks, and the error correction is performed for each of the blocks. Since each of the GRPs includes a signal having a size of 16,704×3 bytes, each of the blocks contains 3,132 bytes. An error-correcting code is generated for these 3,132 bytes and check bits of two bytes are obtained. Thus, the check bits of 32 bytes (=2 bytes×16 blocks) are generated for each of the GRPs.

The 32-byte check bits of the GRP1 are inserted in #161 to #192 K1 bytes. Similarly, the check bits of the GRP2 are inserted in #161 to #192 D5 bytes and the check bits of the GRP3 are inserted in #161 to #192 Z2 bytes.

In the description of the present invention, Hamming code is used as the error-correcting code, for example. A generation polynomial G (X) is expressed by, for example, G (X)=$X^{16}+X^{12}+X^5+1$. Thus, an error of one bit can and corrected, and an error of an even number of bits can be detected.

Data sequences of bytes of each block are converted into data sequences of bits by exchanging bits among the sixteen blocks so that bits which exists in the same block before the conversion exist in different blocks after the conversion. The error correction is performed for the blocks after the conversion, and, thereafter, the bits are rearranged so that the original data sequences are recovered. Thus, consecutive errors up to 16 bits before the conversion can be corrected.

Figure 7:
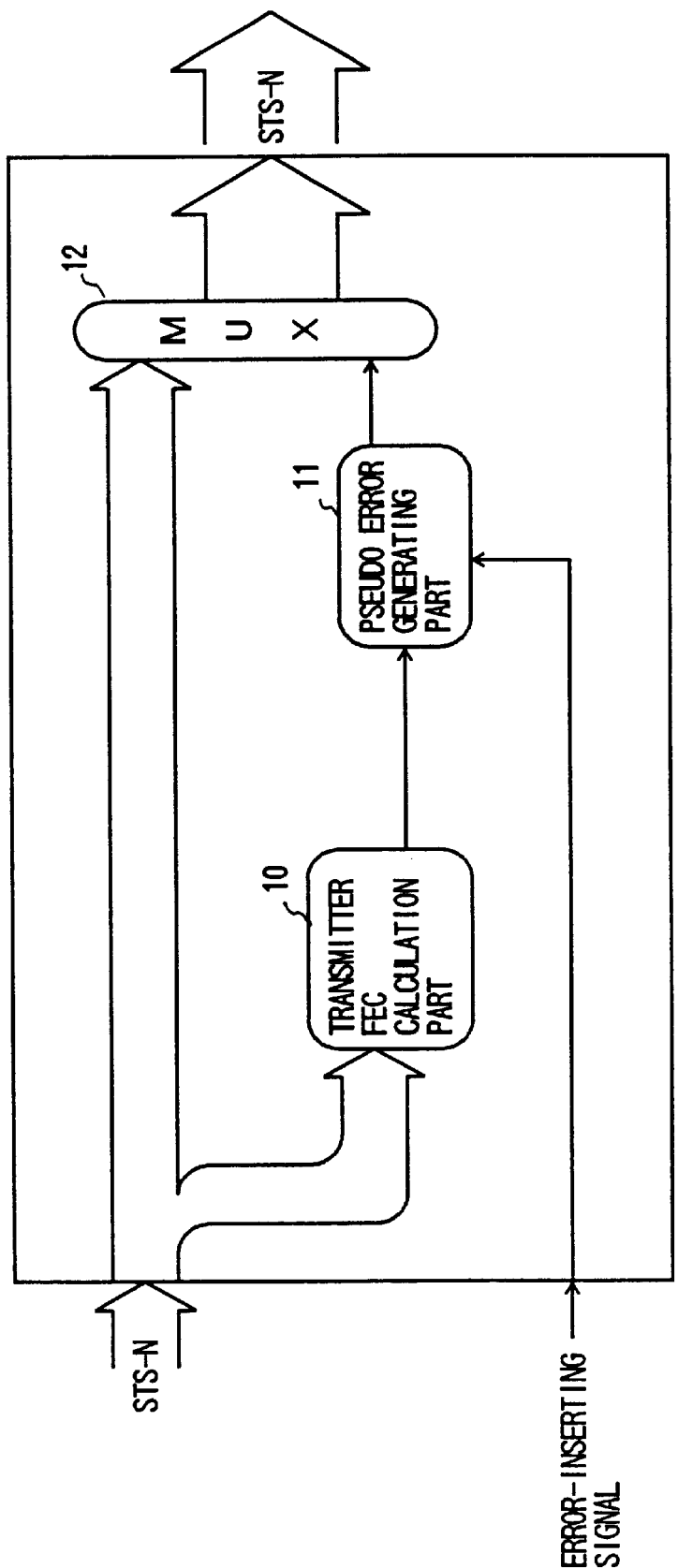
FIG. 7 is a diagram for illustrating a principle of a function of inserting a pseudo error.

Now, a description will be given of a function of inserting a pseudo error of the present invention. FIG. 7 is a diagram for illustrating a principle of the function of inserting a pseudo error. A transmitter FEC calculation part 10 generates check bits for the error correction of STS-N data (main signal data). A pseudo error generating part 11 inserts an n-bit error in the check bits in accordance with an error-inserting signal. A multiplexer part 12 multiplexes the STS-N data and the check bits so that the error-correcting code is transmitted with the main signal. Since the number n of bits of the pseudo error can be arbitrary set in accordance with the error-inserting signal, the pseudo error of any number of bits can be generated.

Figure 8:
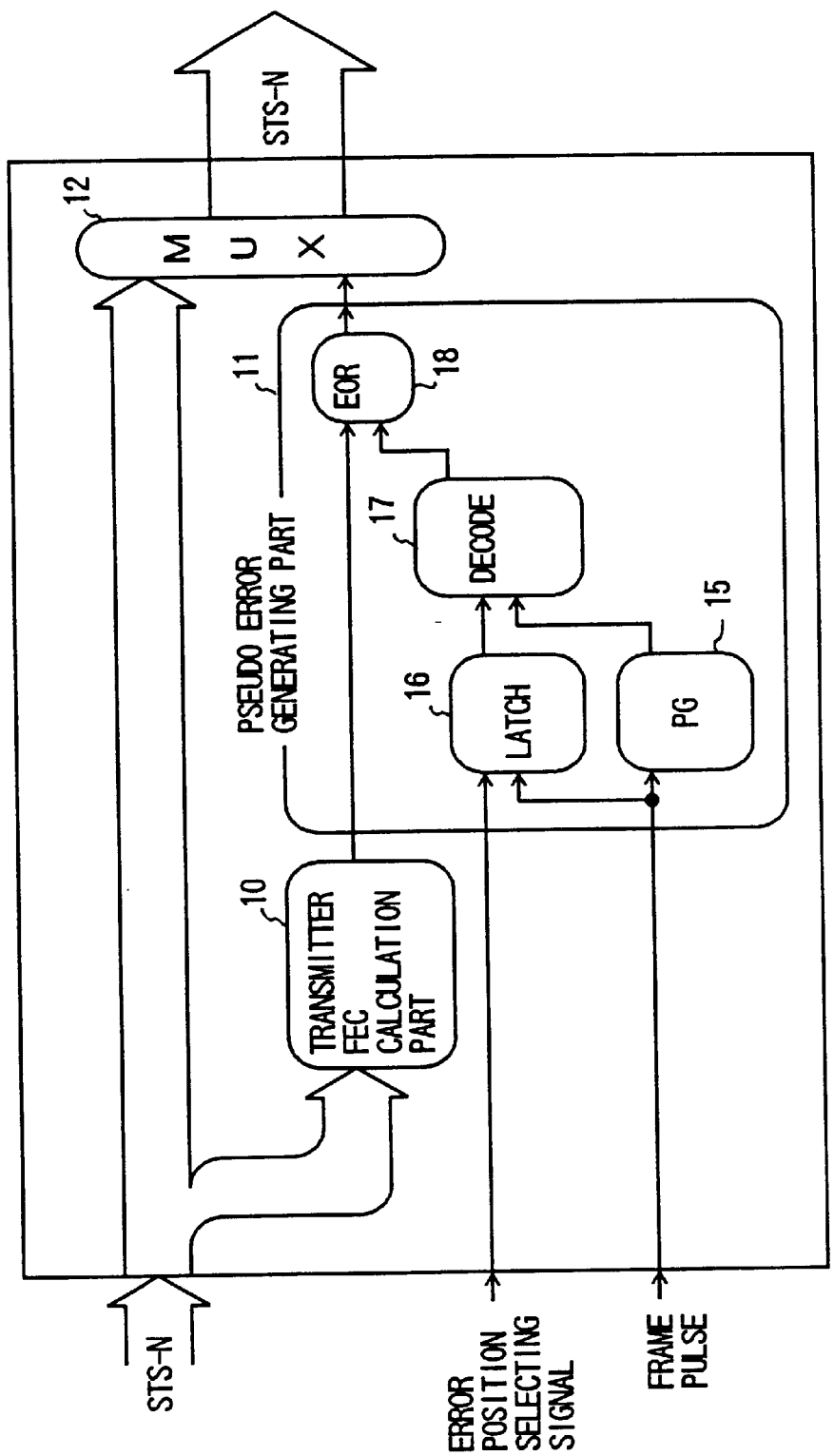
FIG. 8 is a diagram for illustrating a principle of a function of inserting a pseudo error which can select a position in which the pseudo error is inserted.

Next, a description will be given of a function of inserting the pseudo error in selected positions of the check bits. FIG. 8 is a diagram for illustrating a principle of this function. The system shown in FIG. 8 has the same structure as the system shown in FIG. 7 except for the pseudo error generating part 11. The pseudo error generating part 11 shown in FIG. 8 has a latch part 16, a PG part 15, a decoding part 17 and an exclusive-OR logic circuit 18.

The latch part 16 latches an error position selecting signal which indicates a position in which the pseudo error is to be inserted in response to a frame pulse which indicates a head position of each frame. Thus, the error position selecting signal is latched by the latch part 16 at a head position of each frame. The PG part 15 generates a timing signal which indicates a timing at which the pseudo error is to be generated. The decoding part 17 decodes the error position selecting signal in response to the timing signal generated by the PG part 15. The decoded signal is applied to the exclusive-OR circuit 18 where specific bits of the result of the FEC calculation (the check bits) are inverted (that is, a pseudo error is inserted) in accordance with the decoded error position selecting signal, and then multiplexed with the STS-N main signal data. In this way, the pseudo error can be generated in any positions of the check bits in accordance with the error position selecting signal.

Figure 9:
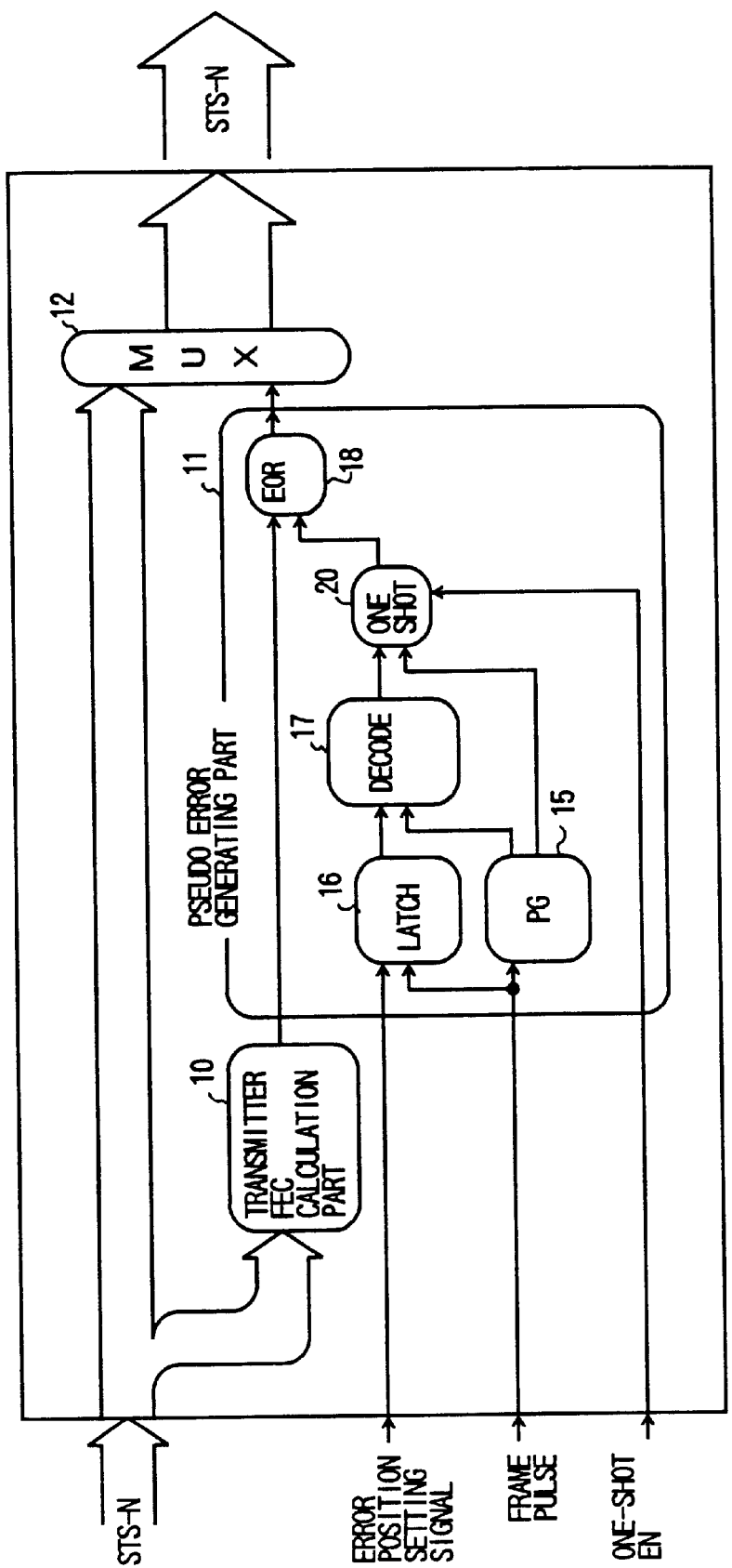
FIG. 9 is a diagram for illustrating a principle of a function of inserting a pseudo error which can select either a mode in which the pseudo error is inserted in a single frame or a mode in which the pseudo error is inserted in every frame.

Next, a description will be given of a function of a switching operation in which the pseudo error is inserted either in a single frame or in every frame. FIG. 9 is a diagram for illustrating a principle of this function. The system shown in FIG. 9 has the same structure as the system shown in FIG. 8 except for a frame switching control part (ONE SHOT) 20.

The decoding part 17 decodes the error position selecting signal in synchronization with the timing signal supplied from the PG part 15, as mentioned above. The frame switching control part 20 determines whether the decoded error position setting signal, which corresponds to a pseudo error, is to be inserted in a single frame or every frame based on a one-shot enabling signal.

FIGS. 10A and 10B are time charts showing operations of the frame: switching control part 20 in a case where the pseudo error is inserted in a single frame and in a case where the pseudo error is inserted in every frame, respectively.

In FIG. 10A, the STS-n data is shown in (1) "STS-n DATA". As shown in (2) "FRAME PULSE", the frame pulse is generated at a head position of each frame. A signal shown in (3) "ERR EN/DIS" indicates whether or not the error-correcting function is validated. Since the error-correcting function is validated in the cases shown in FIGS. 10A and 10B, the ERR EN/DIS signal is set to be "1" (EN) at a time t1 of a frame #1. In FIG. 10A, the one shot-enabling signal shown in (4) "1-SHOT EN/DIS" is set to be "1" (EN) at a time t2 after the time t1, for example. Thus, the pseudo error is inserted in only a frame #2 next to the frame #1 in which the one-shot enabling signal is set to be "1" (EN) and no pseudo error is inserted in a frame #3 and the subsequent frames, although error setting data is set as shown in (5) of FIG. 10A.

On the other hand, if the one-shot enabling signal is maintained to be "0" (DIS) as shown in (4) of FIG. 10B, the pseudo error is inserted in every frame subsequent to the frame #2 after the ERR EN/DIS signal is set to be "1" (EN) at the time t1.

In this way, the pseudo error can be generated for every frame on the transmission line when the one-shot enabling signal is "0" (DIS), and the pseudo error can be generated only for a single frame when the one-shot enabling signal is "1" (EN).

When the pseudo error is inserted in every frame, it is possible to test the FEC function in a situation similar to an actual operating situation. On the other hand, when the pseudo error is inserted in a single frame, it is possible to easily count a number of the errors in the receiver.

Next, a description will be given of a function of automatically switching a state of validation or invalidation of the FEC function. Hereinafter, the state of validation or invalidation of the FEC function is referred to an FEC state.

Generally, a transmission apparatus having the FEC function is provided with a function of validating and invalidating the FEC function. When data is transmitted between such transmission apparatuses, the FEC state must be the same for a transmitter and a receiver in order to achieve a proper transmission.

Figure 11:
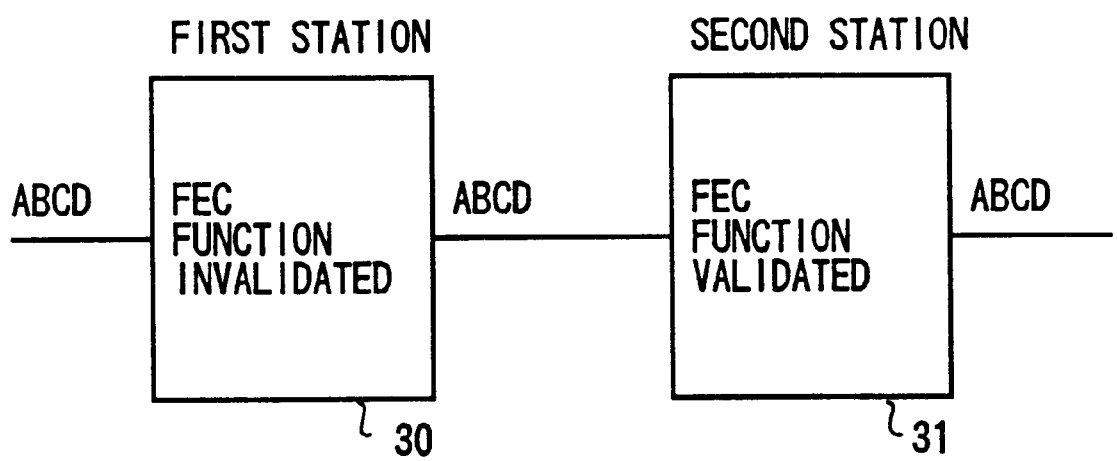
FIG. 11 is a diagram showing a situation where a mismatch of an FEC state has occurred.

If the FEC state is different between the transmitter and the receiver, a part of the main signal may be erroneously changed. That is, if the FEC function is performed in the receiver when the FEC function is invalidated in the transmitter, an error correction may be erroneously performed on the main signal. For example, as shown in FIG. 11, if a first station 30 invalidates the FEC function or the first station 30 does not have the FEC function, the first station 30 transmits as-received data "abcd" to a second station 31. In this case, if the second station 31 performs the FEC function, the data "abcd" may be erroneously corrected to be "abcD", for example.

Thus, it is necessary to prevent such a mismatch of the FEC state between the transmission apparatuses. Additionally, it is necessary to quickly detect such a mismatch while the apparatuses are operating and to immediately recover normal operating states. It is also important to provide such a protection function against the mismatch of the FEC state in view of management and reliability of the apparatuses.

The function of automatically validating or invalidating the FEC function can be divided into two functions, namely, a function (1) of detecting the mismatch and a function (2) of automatically switching the FEC state when the mismatch is detected.

The function (1) of detecting the mismatch is an important function for achieving the function (2) of automatically switching the FEC state. In order to achieve the function (1), it is necessary that one of the transmitter and the receiver can recognize the FEC state of the other so that a difference in the FEC state between the transmitter and the receiver can be determined. In other words, information regarding the FEC state must be transmitted between the transmitter and the receiver.

In the present invention, the transmitter notifies the receiver of the FEC state of the transmitter. For example, in view of easily achieving the function (1) and simplifying the control operation, the transmitter stores information on the FEC state of the transmitter in unused overhead bytes of the signal to be transmitted.

The receiver derives the information from the overhead bytes of the received signal. Then, the receiver compares the FEC state of the transmitter with the FEC state of the receiver. In this case, the receiver determines the FEC state of the transmitter when the same information is received M consecutive times in order to avoid an erroneous operation due to an error generated in the transmission line. If there is a difference in the FEC state between the transmitter and the receiver, it is determined that a mismatch of the FEC state has occurred. In this case, the receiver may generate an alarm so as to notify a system manager of the occurrence of the mismatch to call his attention.

It may be possible that the receiver notifies the transmitter of the FEC state of the receiver, or that the transmitter and the receiver notify each other of the respective FEC states. However, this could result in more complex wiring in the apparatus and more complex control operations of the system.

Next, a description will be given of the function (2) of automatically switching the FEC state when the mismatch is detected. There are two cases of the mismatch, namely, a case where the FEC function is validated in the transmitter and invalidated in the receiver and a case where the FEC function is invalidated in the transmitter and validated in the receiver. Particularly, in the latter case, the main signal may be erroneously changed in the receiver, as described with reference to FIG. 11. By automatically switching the FEC state when the mismatch is detected, it is possible to prevent the main signal from being erroneously changed. Additionally, by generating an alarm with an indication of the FEC state after the switching, it is possible to call the system manager's attention to correct a setting of the FEC state.

Figure 12:
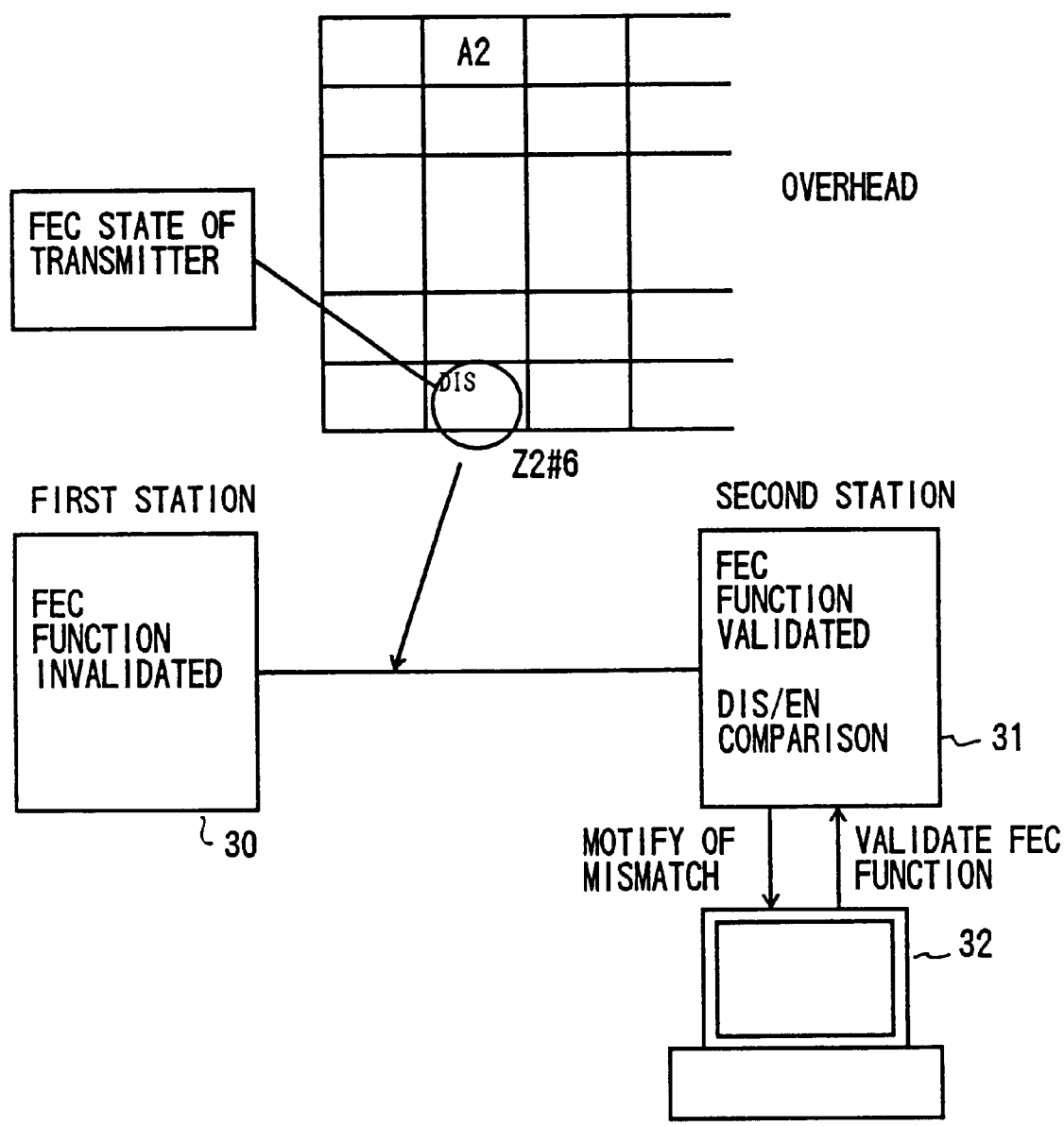
FIG. 12 is a diagram for illustrating a function of automatically switching the FEC state.

FIG. 12 is a diagram for illustrating a principle of the automatic switching of the FEC state. In a situation shown in FIG. 12, for example, the FEC function of the first station 30 is invalidated, and the FEC function of the second station 31 is validated by a CPU 32 which controls the FEC state of the second station 31.

The first station 30 writes data indicating the FEC state ("DIS" in the situation shown in FIG. 12) in a Z2#6 byte of the overhead of a signal to be transmitted. Then, the signal is transmitted to the second station 31. The second station 31 detects the FEC state of the first station 30 written in the Z2#6 byte of. the overhead, and compares the detected FEC state with the FEC state of the second station 31. Since the FEC states of the stations do not correspond to each other in this situation, the second station 31 notifies the CPU 32 of the mismatch so that the FEC state of the second station 31 is switched by the CPU 32.

FIG. 13 shows correspondences between results of the detection of the mismatch and the switching operations of the FEC state of the receiver. As shown in FIG. 13, the FEC function of the receiver is validated only when the FEC function is validated in both the transmitter and the receiver. If there is a mismatch of the FEC state between the transmitter and the receiver, an alarm is generated indicating the mismatch.

As mentioned above, the FEC function of the receiver is not validated when the FEC function of the transmitter is validated and the FEC function of the receiver is invalidated. This is because of a possibility that the receiver does not have the FEC function.

Next, a description will be given of a write/read control of an FIFO buffer in the receiver. When the FEC function is validated in the receiver, a time which is required to decode the error-correcting code must be taken into consideration.

Figure 14:
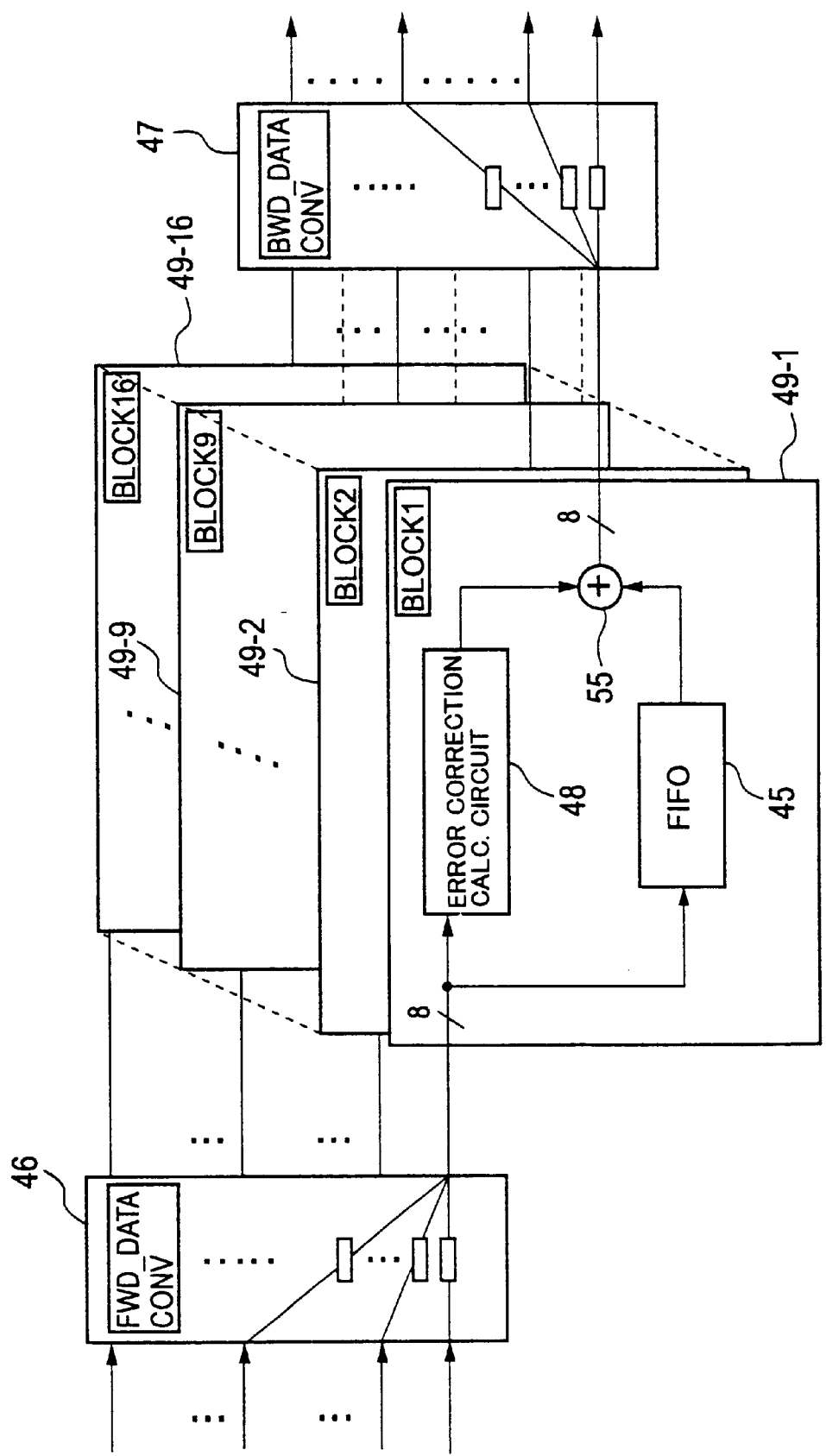
FIG. 14 is a diagram showing an error-correcting circuit of a receiver.

Consider a case where a circuit shown in FIG. 14 is used as an error-correcting circuit. In FIG. 14, a forward data conversion circuit 46 converts the data sequences of the sixteen blocks (which are obtained by dividing each of the GRP1 to GRP3) by exchanging bits among the blocks so that bits of the same block before the conversion belong to different blocks after the conversion. A backward data conversion circuit 47 performs the inverse conversion so that the original data sequences are recovered.

Each of error-correcting circuits 49-1 to 49-6 has an error correction calculating circuit 48 and an FIFO buffer 45. The error correction calculating circuit 48 calculates error-correcting bits (check bits) based on received data sequences. An exclusive-OR logic circuit 55 provides exclusive OR of the error-correcting bits and the main signal so that the error correction is performed.

In a case of the FEC shown in FIG. 6, since the error-correcting code of the GRP1 consists of data of GRP1 and the K1 byte in the overhead, the signal exists over five rows. Thus, the receiver must control a write/read operation of the FIFO buffer 45 so as to synchronize an output of the FIFO buffer 45 and an output of the error correction calculating circuit 48. Also, in an FEC other than the FEC shown in FIG. 6, it is necessary in general to control a write/read operation of the FIFO buffer 45 since the error correction calculating circuit 48 takes a certain time to perform a calculation thereof.

At the same time, a requirement of the standard of the FEC regarding a delay time of the main signal (20 μseconds when the FEC function is invalidated and 150 μseconds when the FEC function is validated) must be satisfied.

Thus, in the present invention, the delay time of the main signal is controlled by switching a timing at which data is read out from the FIFO buffer 45 in accordance with the FEC state.

Figure 15:
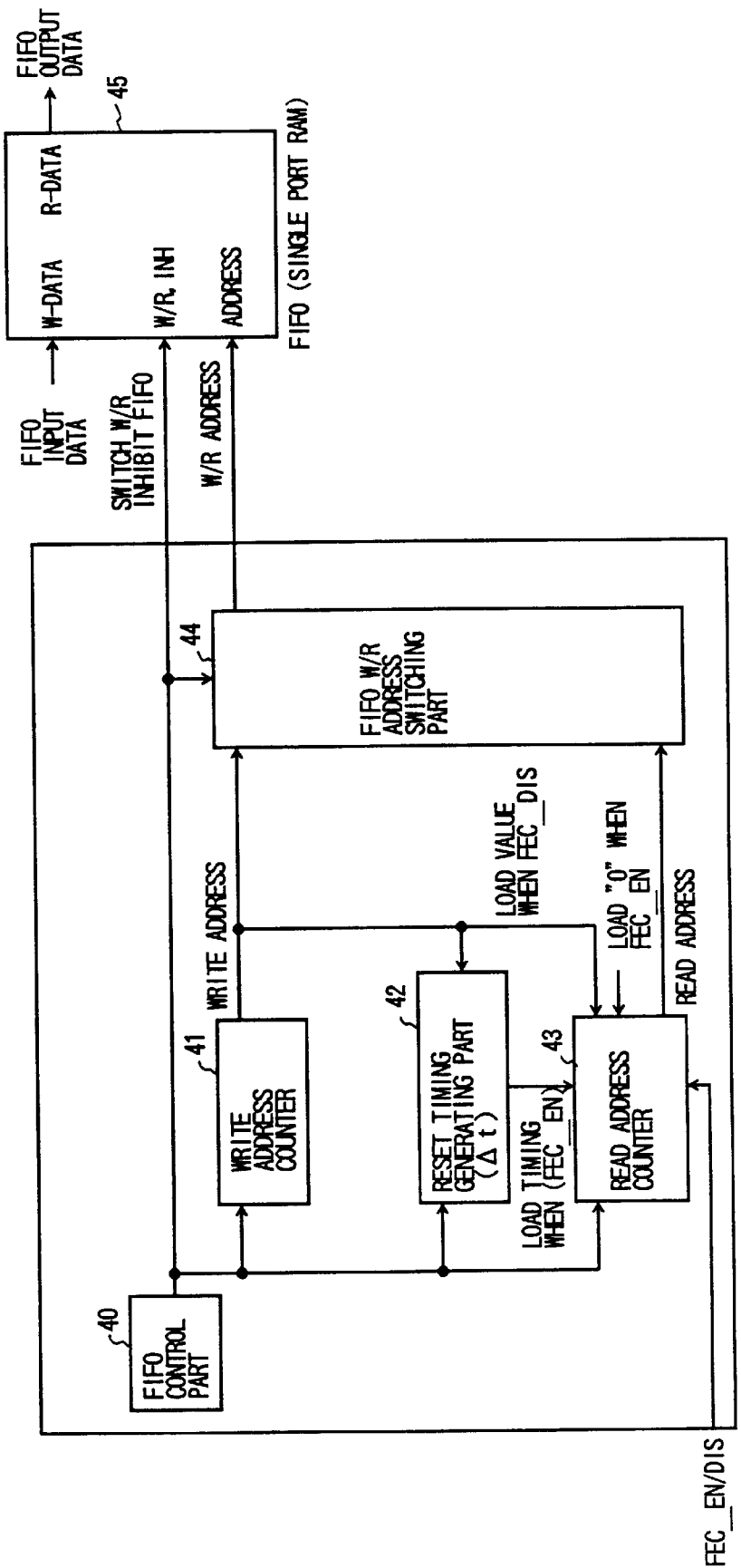
FIG. 15 is a block diagram showing a part for controlling a read/write operation of an FIFO buffer of the receiver.

FIG. 15 is a block diagram of a part for controlling a write/read operation of the FIFO buffer 45. In FIG. 15, the delay time of the main signal when the FEC function is validated is represented by Δt. An FIFO control part 40 shown in FIG. 15 switches write/read operations of the FIFO buffer 45. The FIFO control part 40 can also inhibit the write/read operations of the FIFO buffer 45. A write address counter 41 generates a write address of the FIFO buffer 45. A read address counter 43 generates a read address of the FIFO buffer 45. A value which is loaded to the read address counter 43 is switched in accordance with the FEC state (FEC EN/DIS). A reset timing generating part 42 generates a timing at which the read address counter 43 is loaded with "0" when the FEC function is validated. An FIFO write/read address switching part 44 selects one of the write address and the read address supplied to the FIFO buffer 45.

FIG. 16 is a time chart for illustrating a principle of the FIFO write/read control when the FEC function is validated. In a situation where the FEC function is validated, the read address counter 43 is loaded with "000h" when a value of the write address counter 41 reaches Δt so that an offset between the write address counter 41 and the read address counter 43 is equal to Δt addresses. Thus, the main signal which is written in the FIFO buffer 45 is read out therefrom after Δt addresses.

Figure 17:
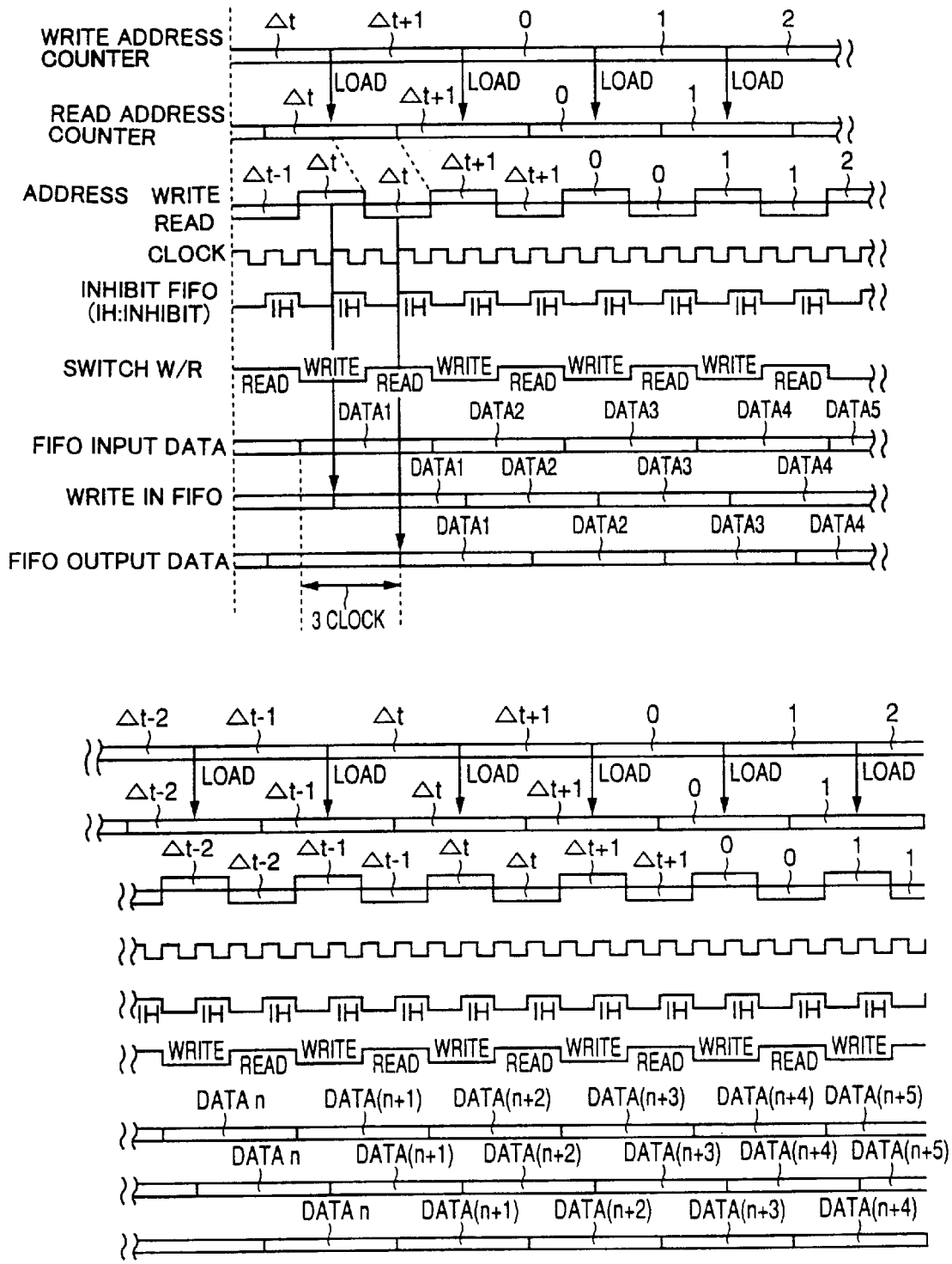
FIG. 17 is a time chart showing timings of the read/write operation of the FIFO when the FEC function is invalidated.

FIG. 17 is a time chart for illustrating a principle of the FIFO write/read control when the FEC function is invalidated. In a situation where the FEC function is invalidated, the read address counter 43 is always loaded with a value of the write address counter 41 so that an offset between the writing address counter 41 and the read address counter 43 is maintained to be zero address. Thus, the main signal which is written in the FIFO buffer 45 is immediately read out therefrom with a minimum delay.

Now, a description will be given of an embodiment in which an improvement of an error rate can be tested by the function of generating a pseudo error.

Figure 2:
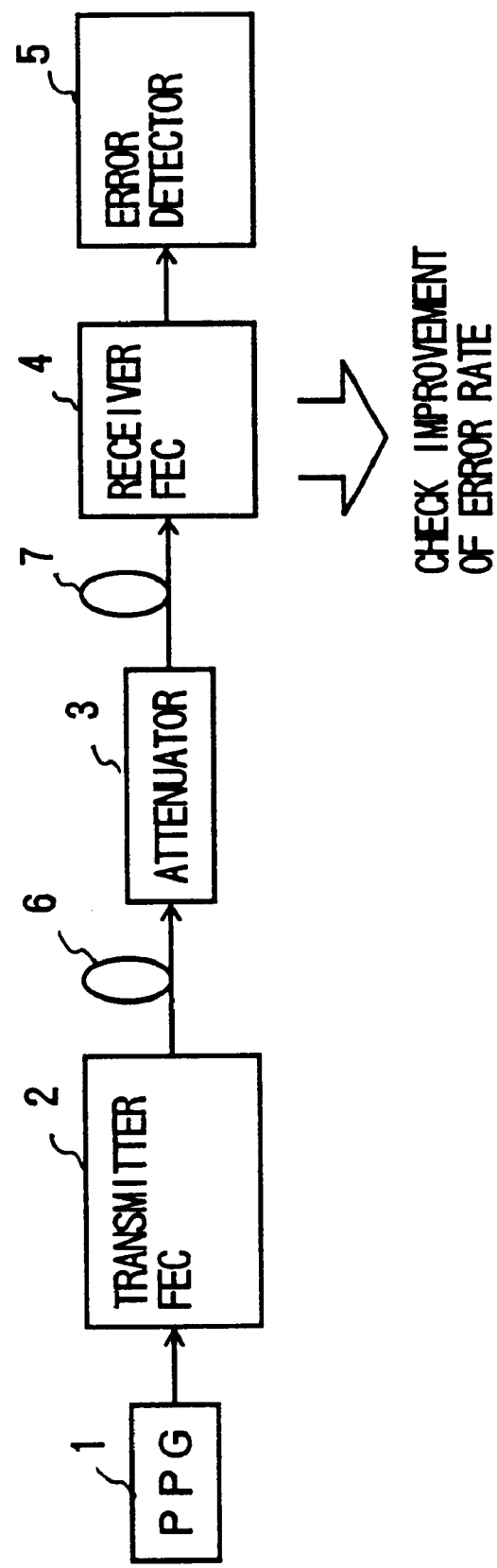
FIG. 2 is a diagram showing a conventional system for testing an FEC function using an attenuator.
Figure 3:
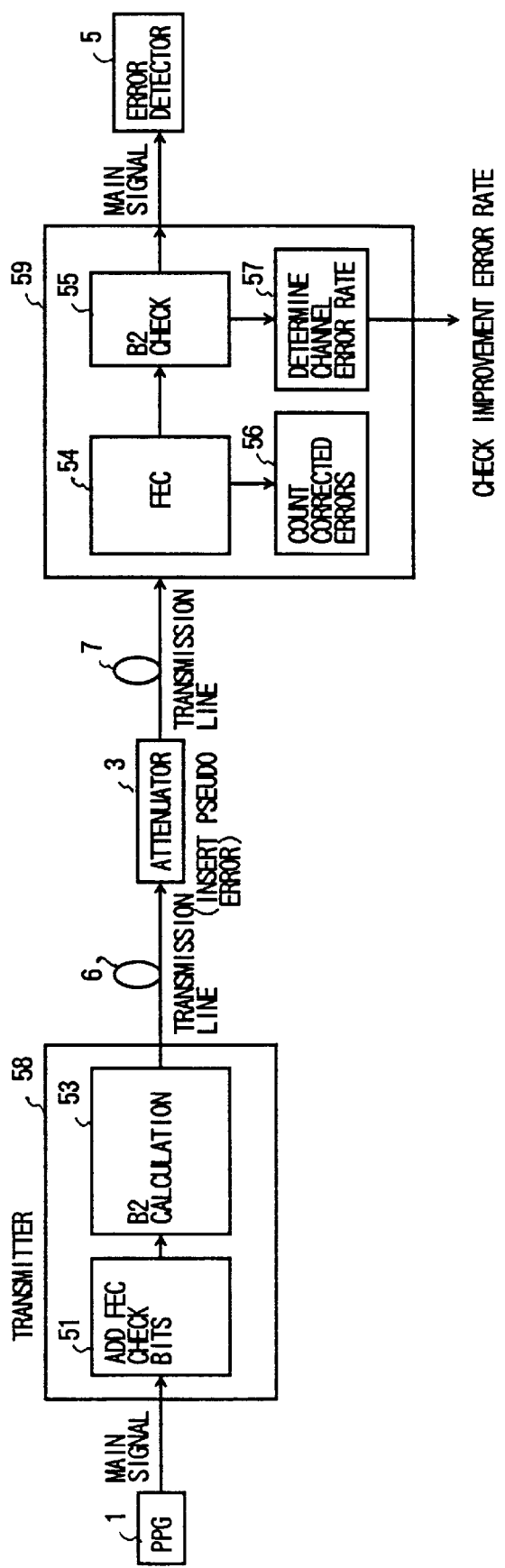
FIG. 3 is a diagram more specifically showing the conventional system shown in FIG. 2.

In the example shown in FIG. 3 where an improvement of an error rate by the FEC is tested by using an attenuator, since a generation of errors can only be controlled on a basis of an average rate, the FEC may be erroneously performed when an error of an odd number (three or more) of bits has occurred, as mentioned above. In this case, the error detector 5 detects a main signal error.

In the present embodiment, it is possible to confirm that the main signal is not adversely affected by the FEC function and that the FEC function properly functions as designed.

Figure 18:
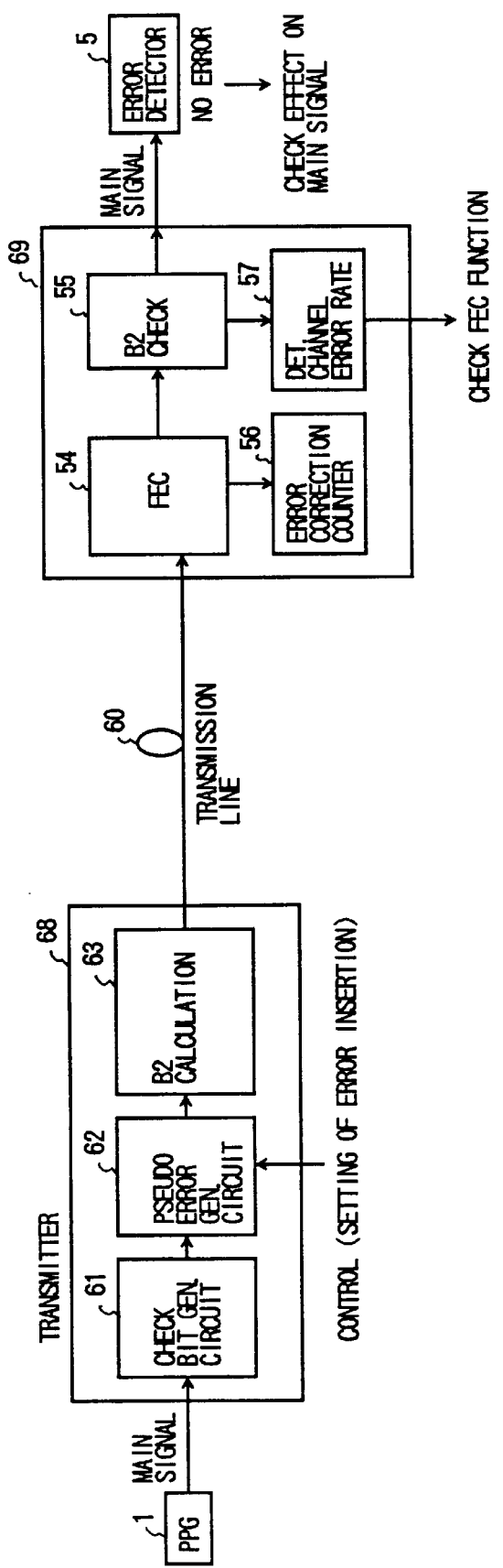
FIG. 18 is a diagram showing an embodiment in which the FEC function is tested by the function of inserting a pseudo error of the present invention.

FIG. 18 shows the embodiment in which the FEC function can be tested by using the function of generating a pseudo error. In FIG. 18, a transmitter 68 has an FEC check bit generating circuit 61, a pseudo error generating circuit 62, and a B2 calculating circuit 63. The FEC check bit generating circuit 61 adds FEC check bits to a main signal supplied from the pulse generator PPG 1, and the pseudo error generating circuit 62 inserts a pseudo error in the main signal. Thereafter, the B2 calculating circuit 63 performs the B2 calculation, and then the signal is transmitted to a receiver 69 after the calculated B2 value is written in the overhead of the signal.

The receiver 69 has an FEC error-correcting circuit 64, a B2 byte check circuit 65, an error correction counter 66 and a channel error rate determining circuit 67. The FEC error-correcting circuit 64 performs an error correction, and the error correction counter 66 counts a number of the corrected errors so as to test the FEC function. The B2 byte check circuit 65 checks the B2 byte, and the channel error rate determining circuit 67 determines a channel error rate.

In the present embodiment, a pseudo error is inserted in the FEC check bits by the transmitter 68 after it is confirmed that no error occurs in the transmission line by the error detector 5 based on the received main signal. The receiver 69 detects and corrects the error, counts a number of the corrected errors, and compares the counted number with a number of the pseudo errors which are inserted by the transmitter 68. Thus, it is possible to determine whether or not the pseudo errors are positively corrected. At this time, it is possible to test an effect of the FEC on the main signal by determining whether an error has occurred in the main signal by the error detector 5. By performing the test described with reference to FIG. 3 after performing the test of the present embodiment, it is possible to test the whole FEC function.

Figure 19:
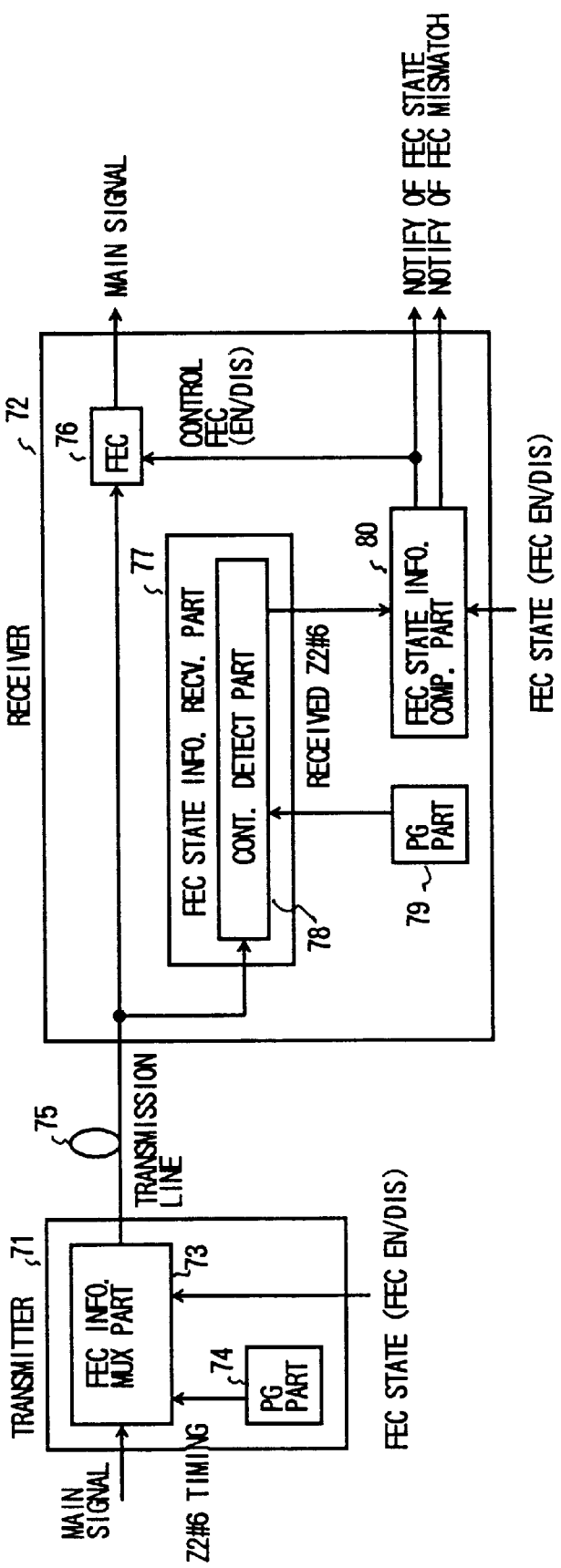
FIG. 19 is a diagram showing an embodiment in which the FEC state is compared between a transmitter and the receiver.

Next, a description will be given of an embodiment in which the FEC state can be compared between a transmitter and a receiver. FIG. 19 is a diagram showing the embodiment.

In FIG. 19, a transmitter 71 has an FEC state information multiplexing part 73 and a PG part 74. The FEC state information multiplexing part 73 performs an FEC coding of a main signal and multiplexes the FEC state information with the coded signal. The PG part 74 notifies the FEC state information multiplexing part 73 of a timing of the Z2#6 byte at which the FEC state information is to be inserted.

A receiver 72 has an FEC circuit 76, an FEC state information receiving part 77, a PG part 79, and an FEC state information comparing part 80. The FEC circuit 76 performs the FEC correction of a received signal and outputs the main signal. The FEC state information receiving part 77 detects the FEC state information. The PG part 79 notifies the FEC state information receiving part 77 of a timing of the Z2#6 byte in which the FEC state information is inserted. The FEC state information comparing part 80 compares the information in the Z2#6 byte and the FEC state of the receiver 72.

The transmitter 71 writes the information on the FEC state of the transmitter 71 in the Z2#6 byte which is one of unused bytes of the overhead. Specifically, when the FEC function is validated, AAh is written in the Z2#6 byte, and when the FEC function is invalidated, "00h" or "FFh" is written in the Z2#6 byte. Then, this data is multiplexed with the main signal to be transmitted to the transmission line. It is also possible that one of "FFh" and "00h" is selectively written in he Z2#6 byte when the FEC function is validated.

The receiver 72 extracts a value of the Z2#6 byte from the received signal. Then, a continuation detecting part 78 determines whether "FFh" or "00h" is detected in three consecutive frames as the value of the Z2#6 byte, and delivers the result to the FEC state information comparing part 80. The FEC state of the receiver 72 is also supplied to the FEC state information comparing part 80, and is compared with the received information on the transmitter 71. The FEC state of the receiver 72 is switched in accordance with the result of the comparison. A notification of the result is also sent to a monitoring and controlling system as the FEC state of the receiver 72 after the switching.

Additionally, if the received data in the Z2#6 byte does not correspond to the FEC state of the receiver 72, it is determined that an FEC mismatch has occurred and a notification of the result is sent to the monitoring and controlling system.

Next, a description will be given of an embodiment in which the FEC state can be automatically switched. FIG. 20 is a table showing the switching operation of the FEC function in the receiver 72. Marks "○" and "X" in a column of "FEC OPERATION" indicate operations of validating and invalidating the FEC function, respectively, in the receiver 72.

The FEC state of the transmitter 71 is represented by "EN" or "DIS". Information on the FEC state in the transmitter 71 is written in the Z2#6 byte of the overhead. When the FEC function is validated, "00h" (ALL "0") or "FFh" (ALL "1") is written in the Z2#6 byte. On the other hand, when the FEC function is invalidated, "AAh" ("10101010") is written in the Z2#6 byte.

The receiver 72 compares the FEC state of the receiver 72 and a value of the Z2#6 byte of the received signal by the FEC state information comparing part 80.

It should be noted that the receiver 72 may receive a signal having a value of the Z2#6 byte other than ALL "0", ALL "1" and "10101010" due to a transmission error. Thus, in the receiver 72, it is determined whether the value of the Z2#6 byte is equal to one of "00h" and "FFh" or equal to a value other than "00h" and "FFh" so that the state information can be correctly received. Additionally, it is determined that "00h" or "FFh" is received only when "00h" or "FFh" is detected in three consecutive frames so that an erroneous operation of the receiver 72 can be avoided.

As mentioned above, according to the present embodiment, a mismatch of the FEC state between the transmitter 71 and the receiver 72 can be detected, and, additionally, the FEC state of the receiver 72 can be automatically switched in response to the detected mismatch.

Figure 21:
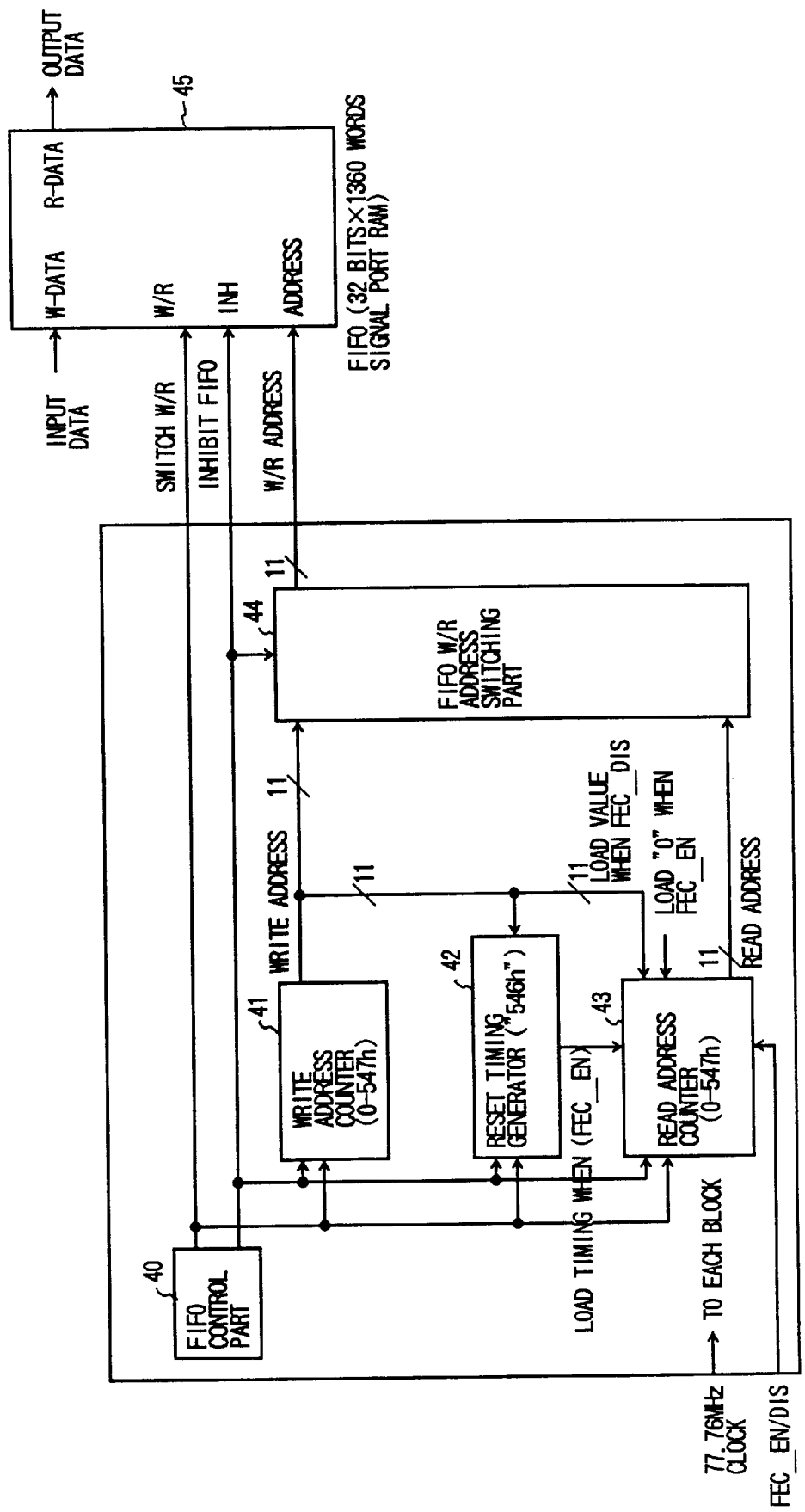
FIG. 21 is a diagram showing an embodiment of the FIFO read/write control.

Next, a description will be given of an embodiment of the FIFO write/read control with reference to FIGS. 21 to 23. FIG. 21 is a diagram showing the embodiment of the FIFO read/write control. In FIG. 21, a value of the delay Δt and a size of the FIFO buffer 45 of FIG. 15 are specified as "547h" and 32 bits×1,360 words, respectively.

FIG. 22 is a time chart showing an operation of the system shown in FIG. 21 when the FEC function is validated. As shown in FIG. 22, when the FEC function is validated, the read address counter 43 is loaded with "000h" every time a value of the write address counter 41 reaches "546h" in accordance with the FEC EN/DIS signal so that an offset between the write address counter 41 and the read address counter 43 is 1,350 addresses.

Since the receiver operates with a frequency of 19.44 MHz, 1,350 addresses correspond to 69.48 $\mu$t seconds (which correspond to five rows). Thus, the main signal data is read out from the FIFO buffer 45 69.48 $\mu$seconds after having been written therein. This value of the time delay satisfies the requirement of less than 150 $\mu$seconds which is specified in the standard.

Figure 23:
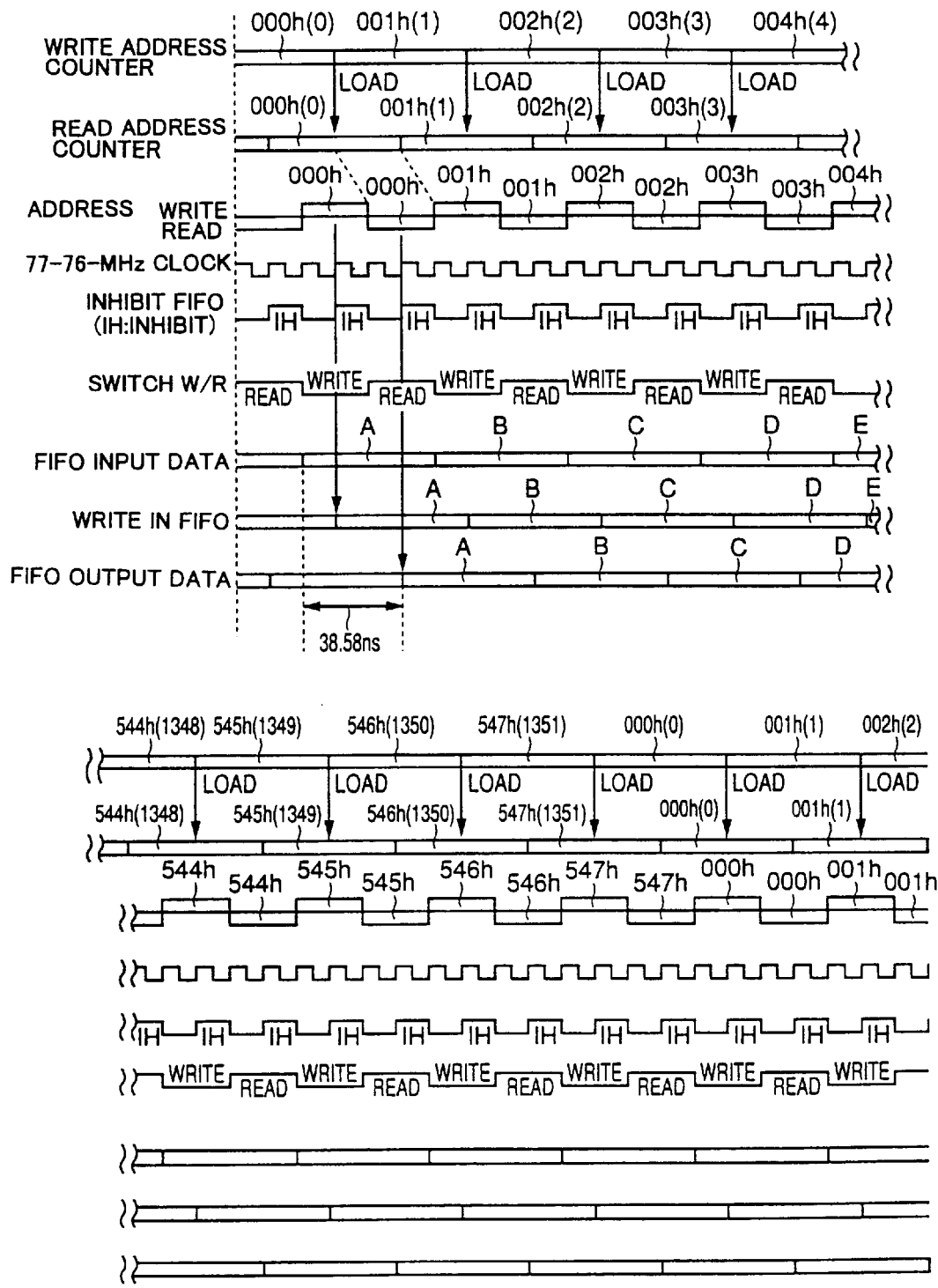
FIG. 23 is a time chart showing an operation of the FIFO read/write control when the FEC function is invalidated.

FIG. 23 is a time chart showing an operation of the system shown in FIG. 21 when the FEC function is invalidated. As shown in FIG. 23, when the FEC function is invalidated, the read address counter 43 is always loaded with a value of the write address counter 41 so that the offset between the write address counter 41 and the read address counter 43 is maintained to be zero address. Thus, the main signal data is read out from the FIFO buffer 45 immediately after having been written therein. In this case, a time delay after the data is written in the FIFO buffer 45 until the data is read out from the FIFO buffer 45 is 38.58 nanoseconds (corresponding to 3 clocks/77.76 MHz). This value of the time delay satisfies the requirement of less than 20 $\mu$seconds which is specified in the standard.

Figure 24:
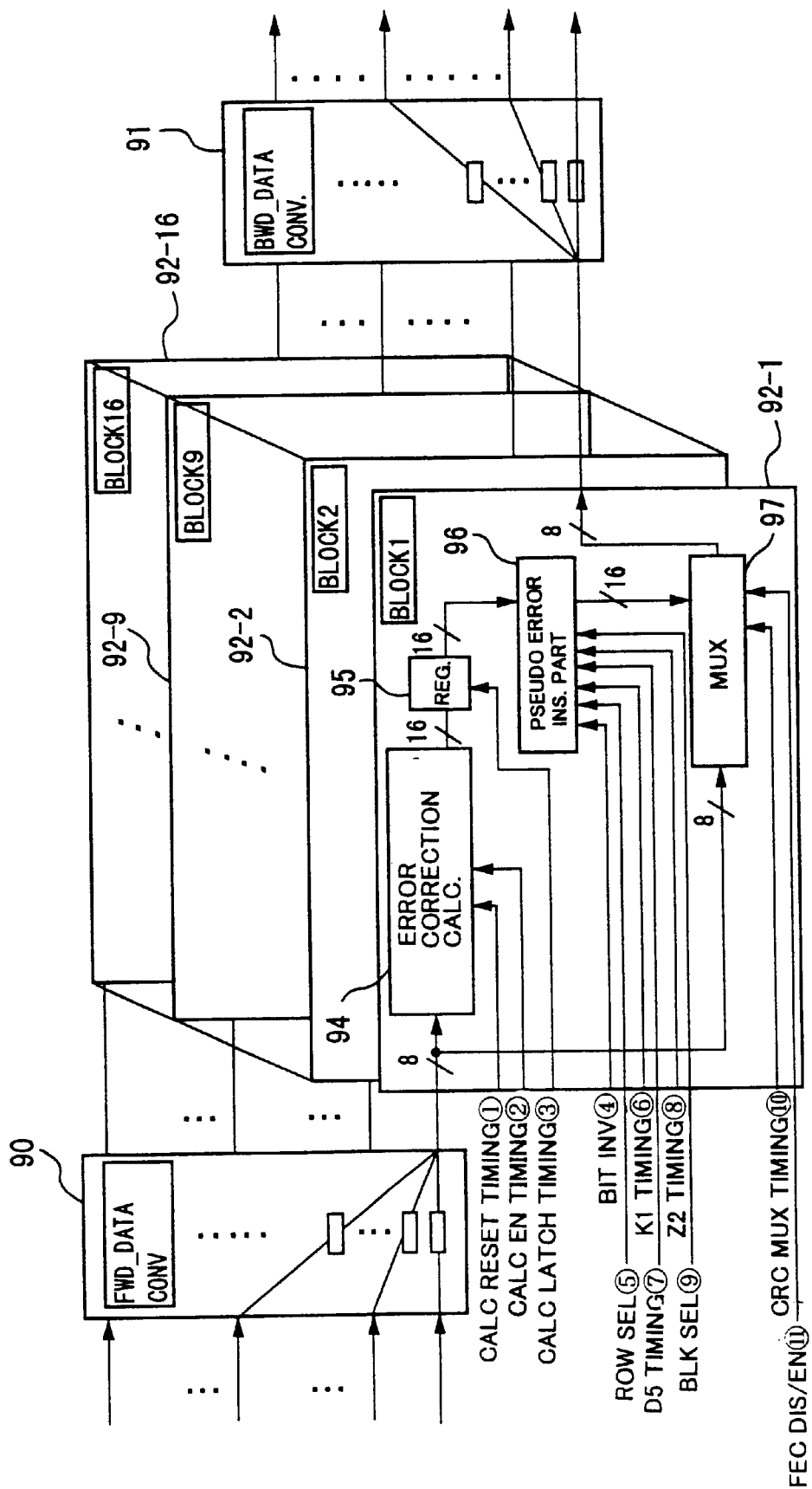
FIG. 24 is a diagram showing a transmitting circuit.

Next, a description will be given of an embodiment of a transmitting circuit used for checking an improvement of an error rate by the function of inserting a pseudo error. FIG. 24 is a diagram showing the transmitting circuit. As shown in FIG. 24, the transmitting circuit comprises a forward data conversion circuit 90, a backward data conversion circuit 91, and error-correcting circuits 92-1 to 92-16.

The forward data conversion circuit 90 and the backward data conversion circuit 91 have the same function of the forward data conversion circuit 46 and the backward data conversion circuit 47 shown in FIG. 14, respectively. That is, the forward data conversion circuit 90 converts the data sequences of the sixteen blocks by exchanging bits among the blocks so that bits of the same block before the conversion belong to different blocks after the conversion, and the backward data conversion circuit 47 performs the inverse conversion so that the original data sequences are recovered.

The error-correcting circuits 92-1 to 92-16 are provided to the respective sixteen blocks. Each of the error-correcting circuits 92-1 to 92-16 comprises an error correction calculating circuit (eight parallel syndrome registers for (25072, 25056) shorted Hamming code) 94, a register 95, a pseudo error inserting part 96 and a multiplexer part (eight parallel CRC code MUX) 97.

The error correction calculating circuit 94 is supplied with ① a calculation reset timing signal which indicates a timing to reset the error correction calculating circuit 94 and ② a calculation enable timing signal which indicates a timing to enable the error correction calculating circuit 94. The register 95 is supplied with ③ a calculation latch timing signal which indicates a timing to latch data by the register 95. Additionally, the pseudo error inserting part 96 is supplied with ④ a bit inverting signal which indicates bits of the 16-bit data of each block to be inverted, ⑤ a row selecting signal which indicates the GRPs to be selected, ⑥ a K1 timing signal which indicates a timing of the K1 byte, ⑦ a D5 timing signal which indicates a timing of the D5 byte, ⑧ a Z2 timing signal which indicate a timing of the Z2 byte, and ⑨ a block selecting signal which indicates a block whose check bits should be inverted. Further, the multiplexer part 97 is supplied with ⑩ a CRC multiplexing timing signal which indicates a timing to multiplex the error code and ⑪ the FEC DIS/EN signal which indicates validation/invalidation of the FEC function.

An eight-bit parallel main signal is supplied to the error correction calculating circuit 94 and the multiplexer part 97 via the forward data conversion circuit 90. The error correction calculating circuit 94 performs a calculation of the error correction on the main signal, and a result of the calculation is stored in the register 95. The pseudo error inserting part 96 inserts a pseudo error in the check bits of the result of the calculation, and the multiplexer part 97 multiplexes the main signal and the check bits. Then, the multiplexed signal is outputted to the backward conversion circuit 91.

Figure 25:
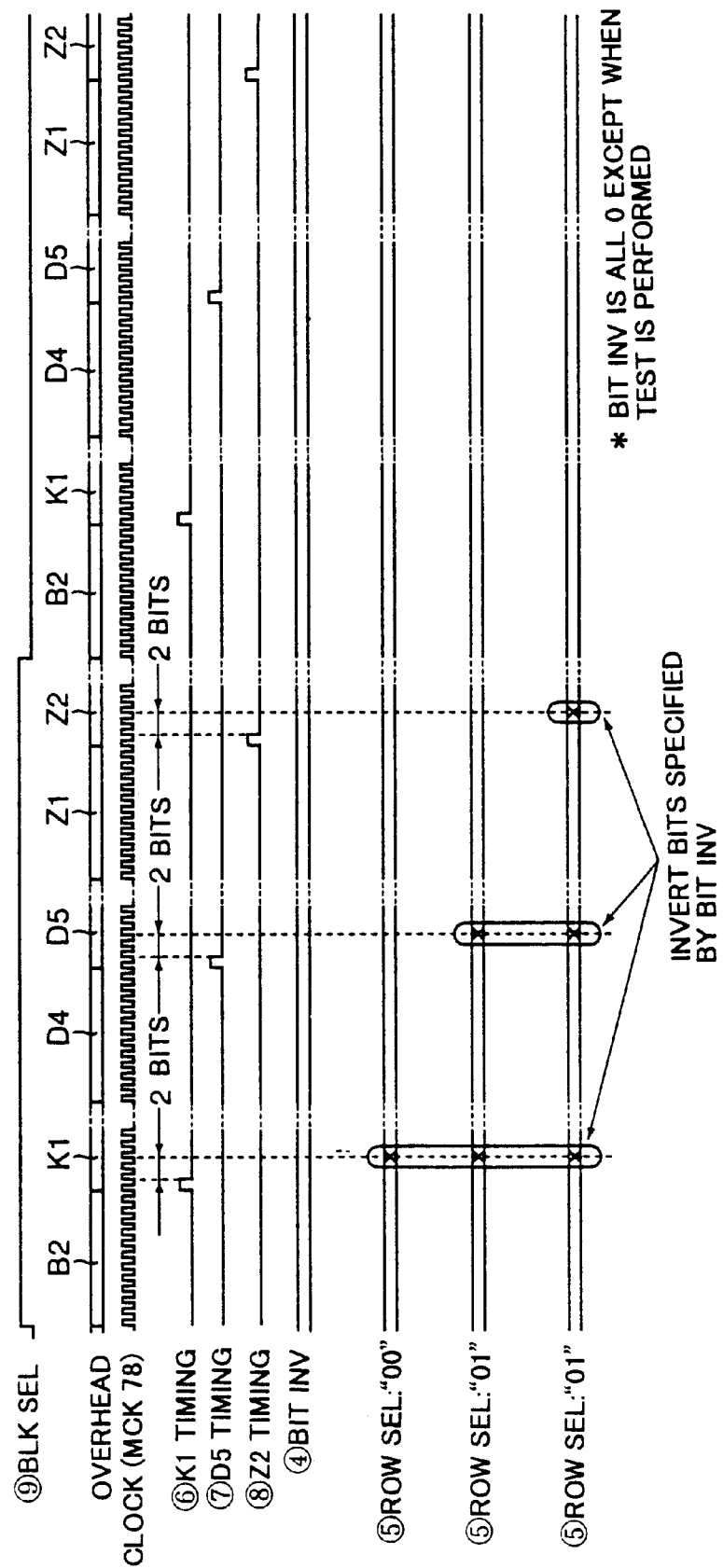
FIG. 25 is a time chart showing an operation of the transmitting circuit shown in FIG. 24.

FIG. 25 is a time chart showing an operation of the transmitting circuit shown in FIG. 24. In FIG. 25, ⑨ the block selecting signal, an overhead signal, a clock (MCK 78), ⑥ the K1 timing signal, ⑦ the D5 timing signal, ⑧ the Z2 timing signal, ④ the bit inverting signal, and ⑤ the row selecting signal are shown from the above. As shown in FIG. 25, a pseudo error is inserted in one, two or three of the GRPs in accordance with a value "00", "01" or "11" of the row selecting signal. The pseudo error is inserted by inverting bits indicated by the bit inverting signal of a block selected by the block selecting signal of a GRP or GRPs selected by the row selecting signal.

In the above-mentioned embodiments, descriptions were given with reference to STS-192 which is standardized in SONET. However, the present invention can be applied not only to STS-192 but also to any communication using a frame which comprises a header including control data and a payload including actual data.

Additionally, in the above-mentioned embodiments, descriptions were given of a case where the Hamming code is used as an error-correcting code. However, any kind of error code other than Hamming code can be used in the present invention.

According to the present invention, since the transmitter is provided with the function of generating a pseudo error, it is possible to easily test the FEC function in the receiver, as well as to correct a single error and to detect a plurality of the errors, in a transmission test between the transmitter and the receiver. Additionally, it is possible to recover a trouble of a transmission line before a user of the transmission notices the trouble.

Additionally, according to the FEC function of the present invention, it is possible to suppress degradation of a BER (bit error rate) due to a noise of each amplifier provided in a long-distance transmission. It is also possible to reduce a number of switching operations of a transmission line which is caused when a bit error rate of B2 MIN error is at a level of $1 \times 10^{-5}$ to $10^{-9}$.

Additionally, according to the present invention, since the function of testing the FEC function is achieved by generating a pseudo error in the transmitter, it is not necessary to provide a device for generating an error in a transmission line in the test of the error-correcting function. Thus, a test of a high quality can be efficiently performed.

Additionally, since the pseudo error is generated in the check bits multiplexed in the unused overhead area, it is possible to prevent the main signal data area from being affected if a pseudo error is erroneously generated. In this case, since the check bits are provided in the LOH, it is not necessary to rewrite the check bits at each relay point. Thus, it is possible to prevent errors from being caused by rewriting the check bits.

Additionally, since the pseudo error can be inserted at any position of the check bits (any position of the sixteen check bits of each of the sixteen blocks), the function of the error correction can be easily and thoroughly tested for each bit.

Additionally, according to the function of automatically switching the FEC state of the present invention, since the receiver automatically switches the FEC state thereof based on the comparison of the FEC state of the transmitter and the receiver, it is possible to easily avoid an erroneous operation of the system due to a mismatch of the FEC state between the transmitter and the receiver, and, thus, a reliability of the system is improved.

Further, according to the write/read control of the FIFO buffer of the present invention, a delay of a signal can be reduced to about 39 nanoseconds when the FEC is not performed, which delay is approximately 70 $\mu$seconds when the FEC is performed. Thus, a requirement of the standard (20 $\mu$seconds when the FEC function is not performed) can be sufficiently satisfied. Additionally, since only a timing at which a data is read out from the FIFO is switched in the present invention, it is not necessary to physically switch data signals when the FEC is performed and when the FEC is not performed. Thus, a design of signal timings can be simplified.

The present invention is not limited to these embodiments, but variations and modifications may be made without departing from the scope of the present invention.

The present application is based on Japanese priority application No. 10-374805 filed on Dec. 28, 1998, the entire contents of which are hereby incorporated for reference.

What is claimed is:

1. An error correction method in a communication using a frame which comprises a header including control data and a payload including actual data, comprising:

a pseudo error inserting step of inserting a pseudo error in check bits of said frame in a transmitter;

wherein said check bits are provided in an unused area of an overhead which constitutes a part of said header.

2. The error correction method as claimed in claim 1, wherein said overhead is a line overhead.

3. An error correction method in a communication using a frame which comprises a header including control data and a payload including actual data, the method comprising:

a step of inserting information on a state of validation or invalidation of an error-correcting function of a transmitter in an unused area of said header, said information indicating whether or not an error correction is performed in the transmitter.

4. The error correction method as claimed in claim 3, further comprising:

a step of comparing said information inserted in said header of said frame received by a receiver with a state of validation or invalidation of an error-correcting function of the receiver; and a step of switching the state of validation or invalidation of the error-correcting function of the receiver when a mismatch is detected between the transmitter and the receiver regarding the state of validation or invalidation of the error-correcting function.

5. The error correction method as claimed in claim 4, further comprising a step of determining the state of validation or invalidation of the error-correcting function of the transmitter when the same information is consecutively received a plurality of times by the receiver.

6. The error correction method as claimed in claim 4, further comprising a step of changing a timing at which data received by the receiver is read out from a buffer provided in the receiver relative to a timing at which said data is written in said buffer in accordance with the state of validation or invalidation of the error-correcting function of the receiver so that a time delay of said data in the receiver is reduced when the error-correcting function is validated.

7. The error correction method as claimed in claim 4, further comprising a step of sending a notification of the state of validation or invalidation of the error-correcting function of the receiver to a control device which controls the state of validation or invalidation of the error-correcting function of the receiver.

8. The error correction method as claimed in claim 7, further comprising a step of notifying said control device of an occurrence of said mismatch.

9. A transmission apparatus which performs a communication using a frame which comprises a header including control data and a payload actual data, the apparatus comprising:

a pseudo error inserting part which inserts a pseudo error in check bits of said frame to be transmitted;

wherein said check bits are provided in an unused area of an overhead which constitutes a part of said header.

10. The transmission apparatus as claimed in claim 9, wherein said overhead is a line overhead.

11. A transmission apparatus which performs a communication using a frame which comprises a header including control data and a payload including actual data, the apparatus comprising:

an information inserting part which inserts information on a state of validation or invalidation of an error correcting function in an unused area of said header of said frame to be transmitted, said information indicating whether or not an error correction is performed.

12. The transmission apparatus as claimed in claim 11, further comprising:

a comparison part which compares said information inserted in said header of the frame received by said transmission apparatus with the state of validation or invalidation of the error-correcting function of said transmission apparatus; and a state switching part which switches the state of validation or invalidation of the error-correcting function of said transmission apparatus when said comparison part detects a mismatch between a transmitter of said received frame and said transmission apparatus regarding the state of validation or invalidation of the error-correcting function.

13. The transmission apparatus as claimed in claim 12, further comprising a mismatch notifying part which sends a notification of information on said mismatch to a device which controls the state of validation or invalidation of the error-correcting function of said transmission apparatus.

14. The transmission apparatus as claimed in claim 12, wherein the said transmission apparatus determines the state of validation or invalidation of the error-correcting function of the transmitter of the received frame when the same information is consecutively received a plurality of times.

15. The transmission apparatus as claimed in claim 12, further comprising a delay reducing part which changes a timing at which received data is read out from a buffer relative to a timing at which said received data is written in said buffer in accordance with the state of validation or invalidation of the error-correcting function of said transmission apparatus so that a time delay of said data is reduced when the error-correcting function is validated.

* * * * *